US010135288B2

(12) United States Patent
Geiszler

(10) Patent No.: US 10,135,288 B2
(45) Date of Patent: Nov. 20, 2018

(54) ELECTRONIC CONTROL MODULE AND DRIVER MODULE FOR CONTROLLING AN ELECTRONIC LOCK MODULE

(71) Applicant: FP Wireless LLC, San Jose, CA (US)

(72) Inventor: Theodore D. Geiszler, Monte Sereno, CA (US)

(73) Assignee: FP Wireless LLC, San Jose, CA (US)

( * ) Notice: Subject to any disclaimer, the term of this patent is extended or adjusted under 35 U.S.C. 154(b) by 98 days.

(21) Appl. No.: 15/280,534

(22) Filed: Sep. 29, 2016

(65) Prior Publication Data

US 2017/0018956 A1    Jan. 19, 2017

Related U.S. Application Data

(63) Continuation-in-part of application No. 15/008,159, filed on Jan. 27, 2016, now Pat. No. 9,876,386, which
(Continued)

(51) Int. Cl.
*H01M 10/44* (2006.01)
*H01M 10/46* (2006.01)
(Continued)

(52) U.S. Cl.
CPC .............. *H02J 7/025* (2013.01); *E05B 47/00* (2013.01); *H01F 38/14* (2013.01); *H02J 50/10* (2016.02);
(Continued)

(58) Field of Classification Search
CPC .......... H02J 7/025; H02J 5/005; H02J 7/0042; H02J 7/355
(Continued)

(56) References Cited

U.S. PATENT DOCUMENTS 3,938,018 A    2/1976  Dahl
5,733,313 A    3/1998  Barreras, Sr. et al.
(Continued)

FOREIGN PATENT DOCUMENTS

AU    1998052770    7/1998
CN    2797546 Y    7/2006
(Continued)

OTHER PUBLICATIONS

PCT-ISR, PCT/US2016/018471, (Transmittal of the ISR), dated Jun. 27, 2016.
(Continued)

*Primary Examiner* — Edward Tso
(74) *Attorney, Agent, or Firm* — CanaanLaw, P.C.; David B. Ritchie

(57) ABSTRACT

Example wireless power transfer systems and methods are described. In one implementation, an electronic control module is configured to generate a signal to be communicated to a transmitter coil. A driver module configured to receive the signal and compensate for any degradation in signal quality is electrically coupled to the electronic control module. The driver module is further coupled to the transmitter coil. A receiver coil, wirelessly electrically coupled to the transmitter coil, is configured to receive a wireless charging signal from the transmitter coil. The implementation also includes an electronic lock module electrically coupled to the receiver coil. The electronic lock module receives the wireless charging signal from the receiver coil and uses the wireless charging signal to charge a rechargeable battery electrically coupled to the electronic lock module.

20 Claims, 16 Drawing Sheets

Related U.S. Application Data is a continuation-in-part of application No. 14/699,867, filed on Apr. 29, 2015, now abandoned.

(51) Int. Cl.

| | | |
|---|---|---|
| H02J 7/02 | (2016.01) | |
| H02J 50/70 | (2016.01) | |
| H02J 50/12 | (2016.01) | |
| H01F 38/14 | (2006.01) | |
| H02J 50/80 | (2016.01) | |
| E05B 47/00 | (2006.01) | |
| H02J 50/10 | (2016.01) | |

(52) U.S. Cl.
CPC .............. *H02J 50/12* (2016.02); *H02J 50/70* (2016.02); *H02J 50/80* (2016.02); *E05B 2047/0058* (2013.01)

(58) Field of Classification Search
USPC .................... 320/108, 114, 115; 307/104
See application file for complete search history.

(56) References Cited

U.S. PATENT DOCUMENTS

| | | | |
|---|---|---|---|
| 7,113,070 B2 | 9/2006 | Deng et al. | |
| 7,548,151 B2* | 6/2009 | Roosli ..................... | E05B 47/00 340/5.6 |
| 8,294,302 B2 | 10/2012 | Peabody et al. | |
| 8,354,914 B2 | 1/2013 | Buckingham et al. | |
| 8,551,163 B2 | 10/2013 | Aber et al. | |
| 8,638,062 B2 | 1/2014 | Baarman et al. | |
| 8,686,598 B2 | 4/2014 | Schatz et al. | |
| 8,772,970 B2 | 7/2014 | Lambrou | |
| 8,774,714 B2 | 7/2014 | Metivier | |
| 8,805,530 B2 | 8/2014 | John | |
| 8,825,173 B2 | 9/2014 | Forsell | |
| 8,862,241 B2 | 10/2014 | Forsell | |
| 8,901,775 B2 | 12/2014 | Armstrong et al. | |
| 8,907,531 B2 | 12/2014 | Hall et al. | |
| 9,089,717 B2 | 7/2015 | Forsell | |
| 9,132,276 B2 | 9/2015 | Meskens | |
| 9,290,966 B2 | 3/2016 | Hanchett, Jr. | |
| 2004/0183652 A1 | 9/2004 | Deng et al. | |
| 2007/0146115 A1 | 6/2007 | Roosli et al. | |
| 2008/0300658 A1 | 12/2008 | Meskens | |
| 2010/0179384 A1 | 7/2010 | Hoeg et al. | |
| 2011/0195666 A1 | 8/2011 | Forsell | |
| 2011/0227529 A1 | 9/2011 | Smith et al. | |
| 2011/0311084 A1 | 12/2011 | Drader | |
| 2012/0235502 A1 | 9/2012 | Kesler et al. | |
| 2013/0214731 A1 | 8/2013 | Dinsmoor | |
| 2013/0293025 A1 | 11/2013 | Xu et al. | |
| 2013/0307474 A1 | 11/2013 | Shimura et al. | |
| 2014/0136414 A1 | 5/2014 | Abhyanker | |
| 2014/0197692 A1 | 7/2014 | Chen et al. | |
| 2014/0241555 A1 | 8/2014 | Terlizzi | |
| 2014/0260459 A1 | 9/2014 | Nguyen et al. | |
| 2014/0340032 A1 | 11/2014 | Curtis | |
| 2015/0008761 A1 | 1/2015 | Kesler et al. | |
| 2015/0048790 A1 | 2/2015 | Rudser et al. | |
| 2016/0292669 A1* | 10/2016 | Tunnell .............. | G06Q 20/3278 |
| 2016/0322847 A1 | 11/2016 | Geiszler | |
| 2016/0322855 A1 | 11/2016 | Geiszler | |
| 2017/0018956 A1 | 1/2017 | Geiszler | |
| 2017/0331320 A1 | 11/2017 | Geiszler | |

FOREIGN PATENT DOCUMENTS

| | | |
|---|---|---|
| CN | 102071838 B | 10/2012 |
| CN | 204103574 U | 1/2015 |
| DE | 3612761 A1 | 10/1987 |
| DE | 10206700 A1 | 8/2003 |
| EP | 2660785 A2 | 11/2013 |
| WO | 2000077330 A1 | 12/2000 |
| WO | 2002077399 A1 | 10/2002 |
| WO | 2005041385 A2 | 5/2005 |
| WO | 2006006834 A1 | 1/2006 |
| WO | 2008011657 A1 | 1/2008 |
| WO | 2016175910 A1 | 11/2016 |

OTHER PUBLICATIONS

PCT-IPRP, PCT/US2016/018471, (Transmittal of the IPRP), dated Nov. 9, 2017.
Assa Abloy ICPT Product Materials, Assa Abloy, Nov. 2012.
C. Sharpe, Wireless Power Transfer for Access Control Applications, Access & Security, Jul. 17, 2017.

\* cited by examiner

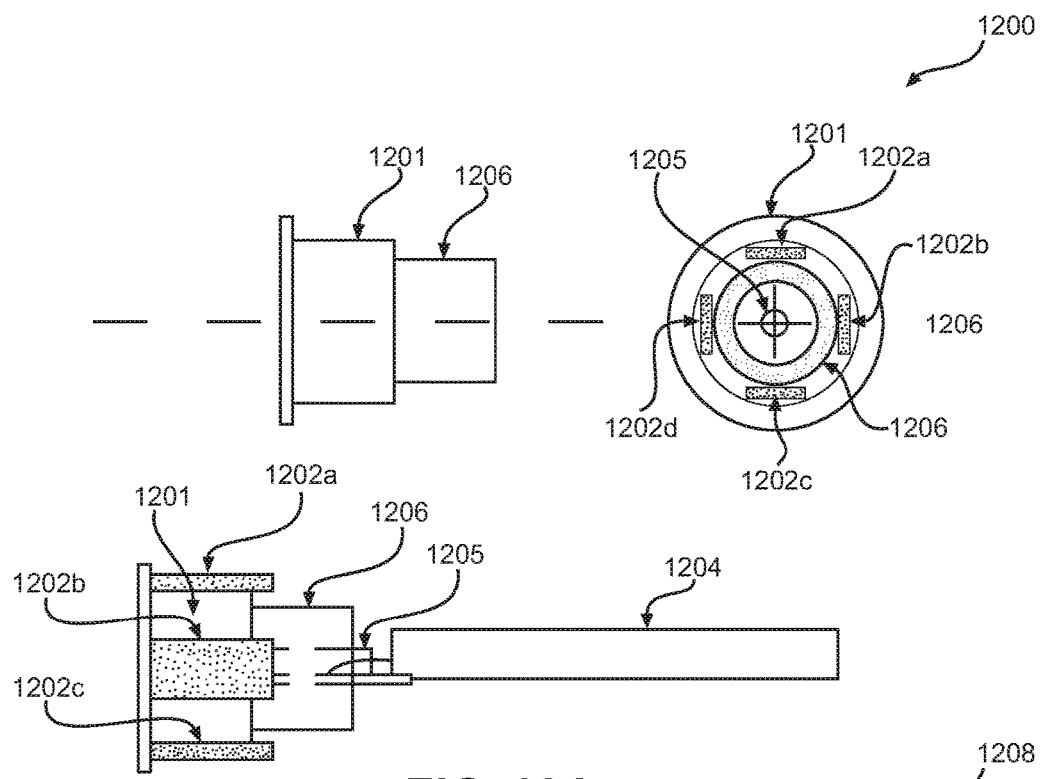
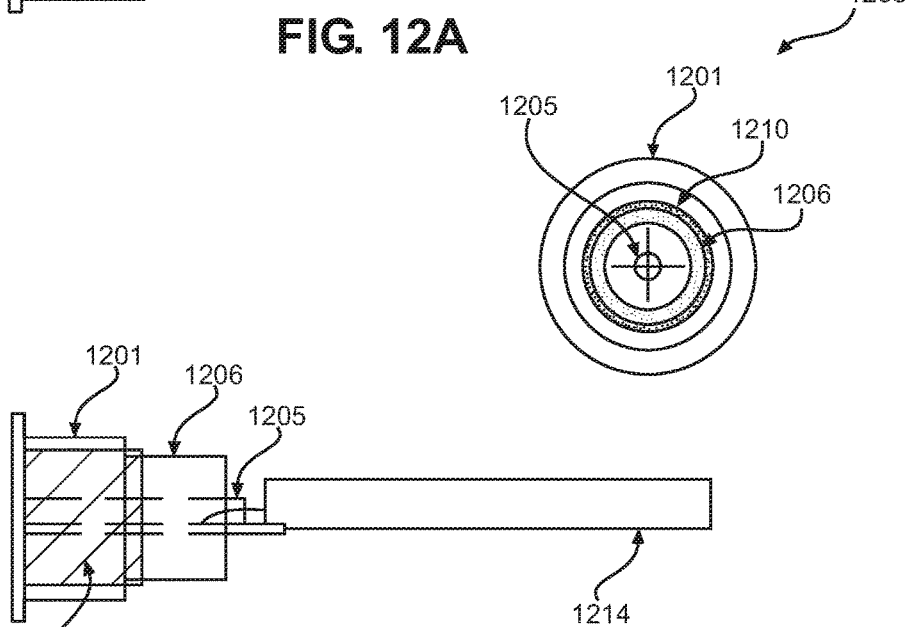
FIG. 12A
FIG. 12B

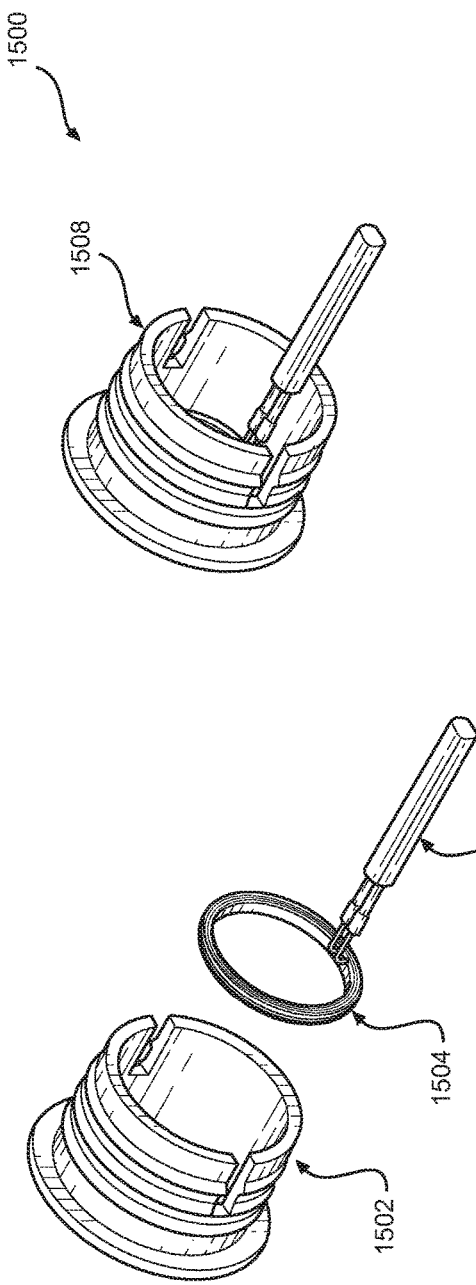
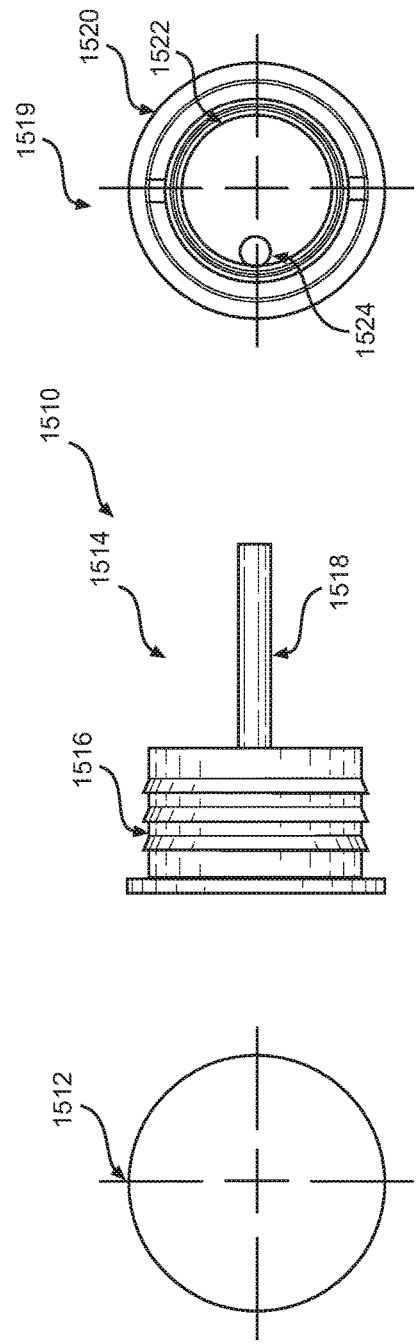
FIG. 15A
FIG. 15B

ELECTRONIC CONTROL MODULE AND DRIVER MODULE FOR CONTROLLING AN ELECTRONIC LOCK MODULE

RELATED APPLICATIONS

This application is a continuation-in-part of application Ser. No. 15/008,159, filed on Jan. 27, 2016, which is a continuation-in-part of application Ser. No. 14/699,867, filed on Apr. 29, 2015, which are incorporated herein by references in their entirety.

TECHNICAL FIELD

The present disclosure relates to systems and methods that wirelessly transmit electrical power across a physical gap.

BACKGROUND

In the field of wireless electronic systems powered by rechargeable batteries, there exists a need for a system that can recharge a rechargeable battery wirelessly, especially in the field of wireless electronic door locking systems. Typical electronic door locks are powered by battery packs that are bulky and disposable (i.e., not rechargeable). These battery packs typically need to be replaced periodically. Regular maintenance on these electronic door locks is therefore required to replace the disposable batteries.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIGS. 12A and 12B depict two different embodiments of a transmitter coil associated with the wireless battery charging system.

FIGS. 15A and 15B depict different views of an embodiment associated with a receiver coil associated with the wireless battery charging system.

DETAILED DESCRIPTION

Figure 1:
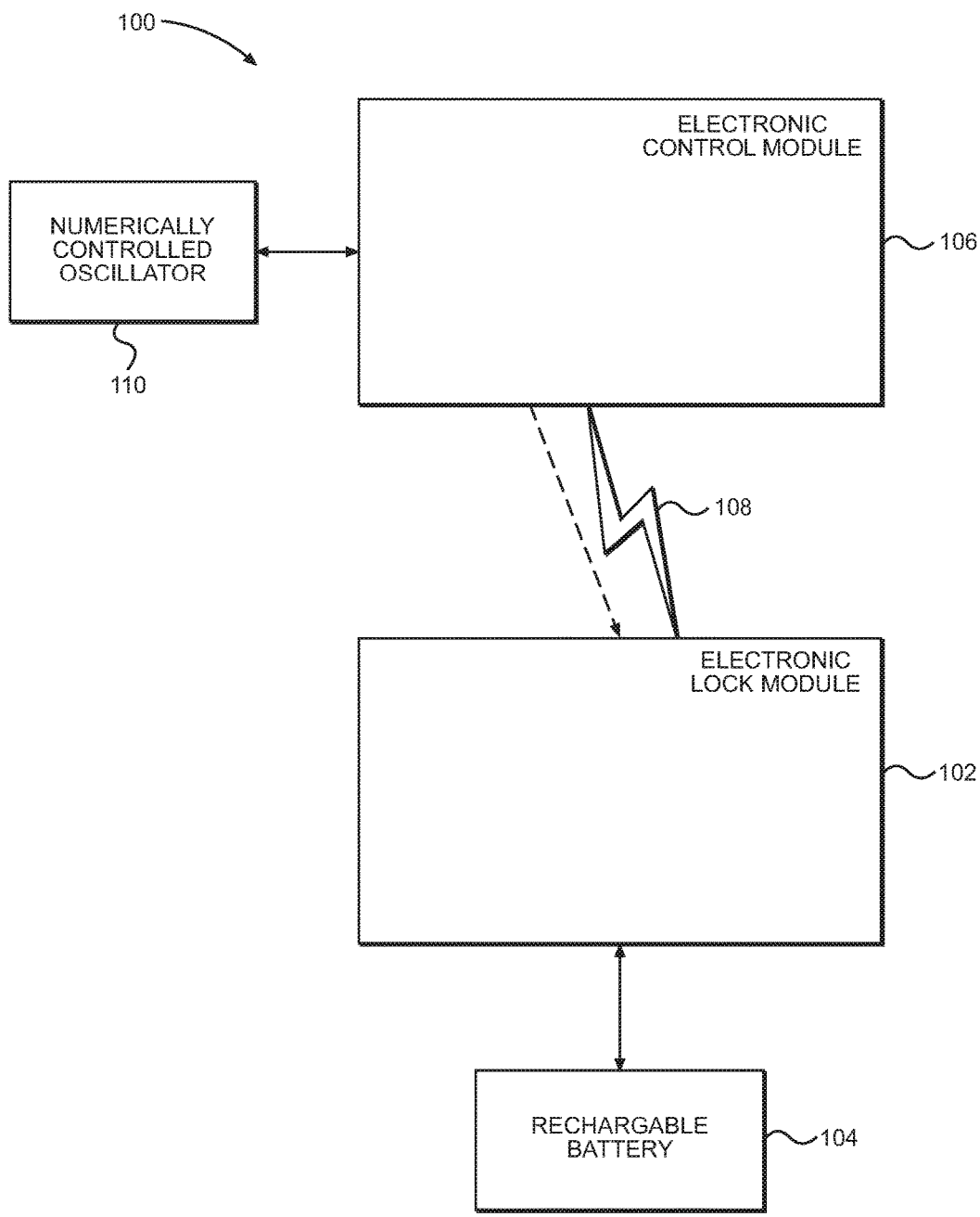
FIG. 1 represents a block diagram that shows an embodiment of a wireless battery charging system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein disclose an apparatus and methods that are configured to wirelessly recharge a rechargeable battery that is associated with, and powers, an electronic door locking system. The system consists of an electronic lock module attached to a door. The electronic lock module is electrically coupled to a rechargeable battery, which powers both the electronic lock module and an electronic door lock associated with the door. In an embodiment, an electronic control module is physically coupled (attached) to a door frame corresponding to the door. The electronic control module receives periodic input data from the electronic lock module, wherein the input data includes the status of the charge on the rechargeable battery. The electronic control module processes the data received from the electronic lock module and determines whether the charge on the rechargeable battery has fallen below a threshold value, wherein the threshold value is either a predetermined threshold value, or the threshold value is dynamically computed based on a plurality of variables that include but are not limited to the age of the battery, the temperature of the battery, the ambient temperature and the use rate. If the electronic control module determines that the charge on the rechargeable battery has fallen below the threshold value, the electronic control module wirelessly transmits a charging signal to the electronic lock module. The electronic lock module wirelessly receives this charging signal and uses this charging signal to charge the rechargeable battery, thereby eliminating the need for periodic inspection or maintenance of the door lock in order to replace or otherwise service the batteries in a disposable battery pack.

FIG. 1 represents a block diagram that shows an embodiment 100 of a wireless battery charging system. In this embodiment, the system is comprised of an electronic lock module 102 that may be associated with a door, and an electronic control module 106 that may be associated with a door frame associated with the door. In some embodiments, the electronic control module 106 is configured to generate a wireless charging link 108 between the electronic control module 106 and the electronic lock module 102, where the wireless charging link 108 is unidirectional. In some embodiments, the wireless charging link 108 may be an inductively-coupled link and the transmission frequency associated with the charging signal may be approximately 125 kHz. In other embodiments, the wireless charging link 108 may be an RF-coupled link.

The electronic control module 106 transmits a charging signal over the wireless charging link 108 to the electronic lock module 102. The electronic lock module 102 receives the charging signal and uses the charging signal to recharge a rechargeable battery 104 that is electrically coupled to electronic lock module 102. In alternate embodiments, battery 104 can be located within electronic lock module 102. In some embodiments, the electronic control module 106 is associated with a numerically controlled oscillator (NCO) 110. The numerically controlled oscillator 110 is configured to input a signal to the electronic control module 106 so that the electronic control module can vary the transmission frequency of the charging signal over the wireless charging link 108 based on the input signal received from the numerically controlled oscillator 110. In alternate embodiments, numerically controlled oscillator 110 can be located in electronic control module 106. In some embodiments, numerically controlled oscillator 110 may be replaced by a fixed-frequency oscillator.

Figure 2:
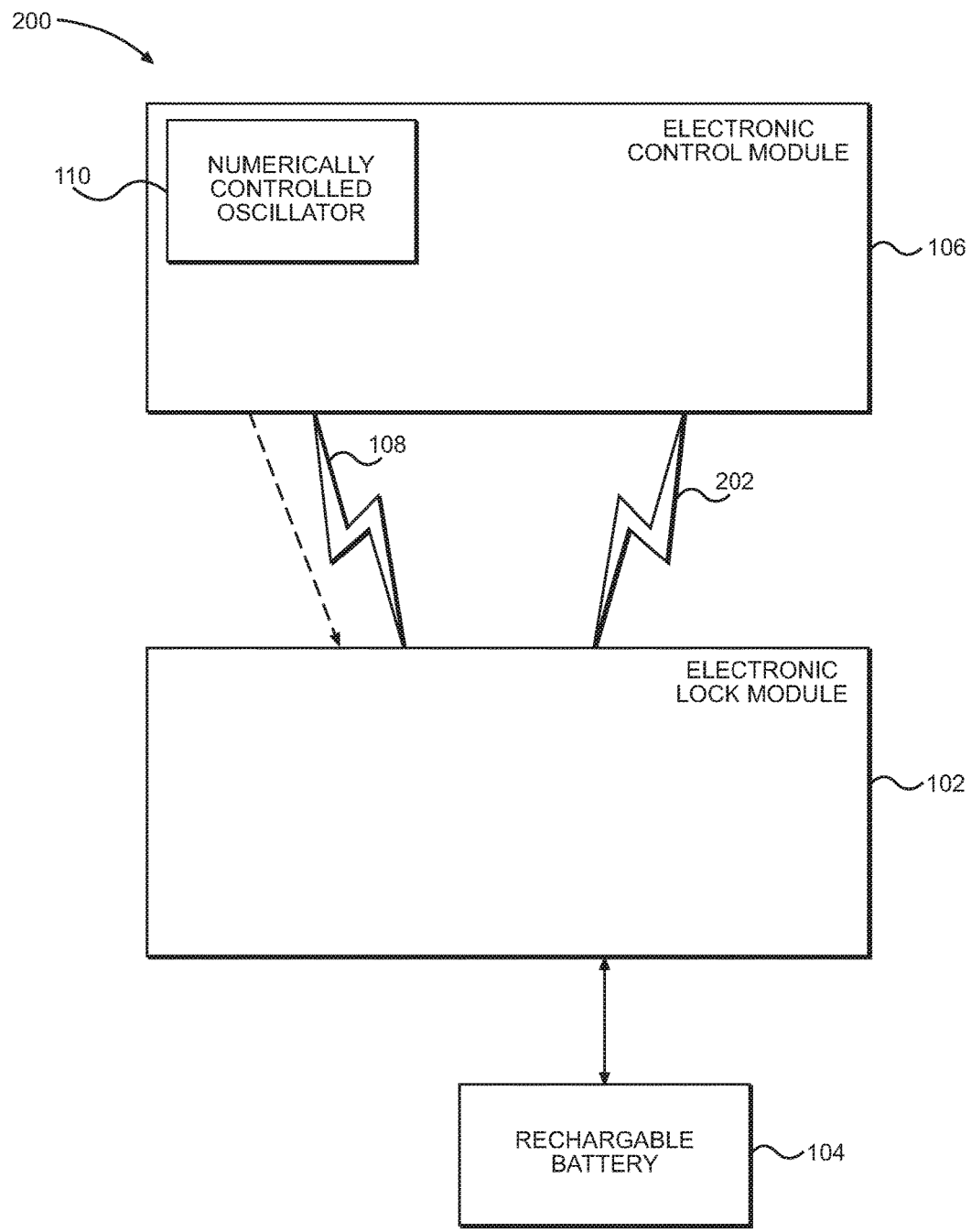
FIG. 2 represents a block diagram that shows another embodiment of the wireless battery charging system.

FIG. 2 represents a block diagram that shows another embodiment 200 of the wireless battery charging system. In some embodiments, wireless battery charging system 200 comprises electronic lock module 102 and electronic control module 106, where the electronic control module 106 is configured to generate a wireless charging link 108 between the electronic control module 106 and the electronic lock module 102, where the wireless charging link 108 is unidirectional. In some embodiments, the wireless charging link 108 may be an inductively-coupled link and the transmission frequency associated with the charging signal may be approximately 125 kHz. In other embodiments, the wireless charging link 108 may be an RF-coupled link. The electronic control module 106 transmits a charging signal over the unidirectional wireless charging link 108 to the electronic lock module 102. The electronic lock module 102 receives the charging signal and uses the charging signal to recharge a rechargeable battery 104. In some embodiments, the electronic lock module 102 is configured to generate a wireless communications link 202 between the electronic lock module 102 and the electronic control module 106. In some embodiments, the wireless communications link 202 may be an inductively coupled link with a transmission frequency of approximately 125 kHz. In other embodiments, the wireless communications link 202 may be an RF-coupled link with a transmission frequency of approximately 400 MHz. Wireless communications link 202 may be used, for example, to communicate information from the electronic lock module 102 to the electronic control module 106. In some embodiments, the information communicated from the electronic lock module 102 to the electronic control module 106 may include a measure of the power received by the electronic lock module 102 from the electronic control module 106 via the wireless charging link 108.

Electronic control module 106 may also include numerically controlled oscillator 110, where numerically controlled oscillator 110 is configured to vary the transmission frequency of the charging signal over the wireless charging link 108. In some embodiments, the electronic lock module 102 transmits a feedback signal to the electronic control module 106 over wireless communications link 202, where the feedback signal is a measure of the power of the charging signal received by the electronic lock module 102. In some embodiments, the numerically controlled oscillator 110 varies the transmission frequency of the charging signal over a range of values, and for each value of the transmission frequency, the electronic control module 106 receives a feedback signal from electronic lock module 102, and stores the associated value of the power of the charging signal as received by the electronic lock module 102. Once the entire transmission frequency range has been covered, the electronic control module 106 selects the transmission frequency associated with the maximum power of the charging signal as received by the electronic lock module 102, and transmits subsequent transmissions of the charging signal at the transmission frequency associated with the maximum power of the charging signal as received by the electronic lock module 102. In this way, maximum power coupling over the wireless charging link 108 associated with the charging signal is maintained. The advantage of transmitting the charging signal at the frequency at which maximum power transfer occurs is that it increases the efficiency of the battery charging system, allowing the maximum amount of power to be wirelessly coupled from the electronic control module 106 to the electronic lock module 102 via the wireless charging link 108. In some embodiments, this feature of determining transmission frequency associated with the maximum power of the charging signal as received by the electronic lock module 102 by varying the transmission frequency of the charging frequency over a range of values is referred to as "autotune."

Figure 3A:
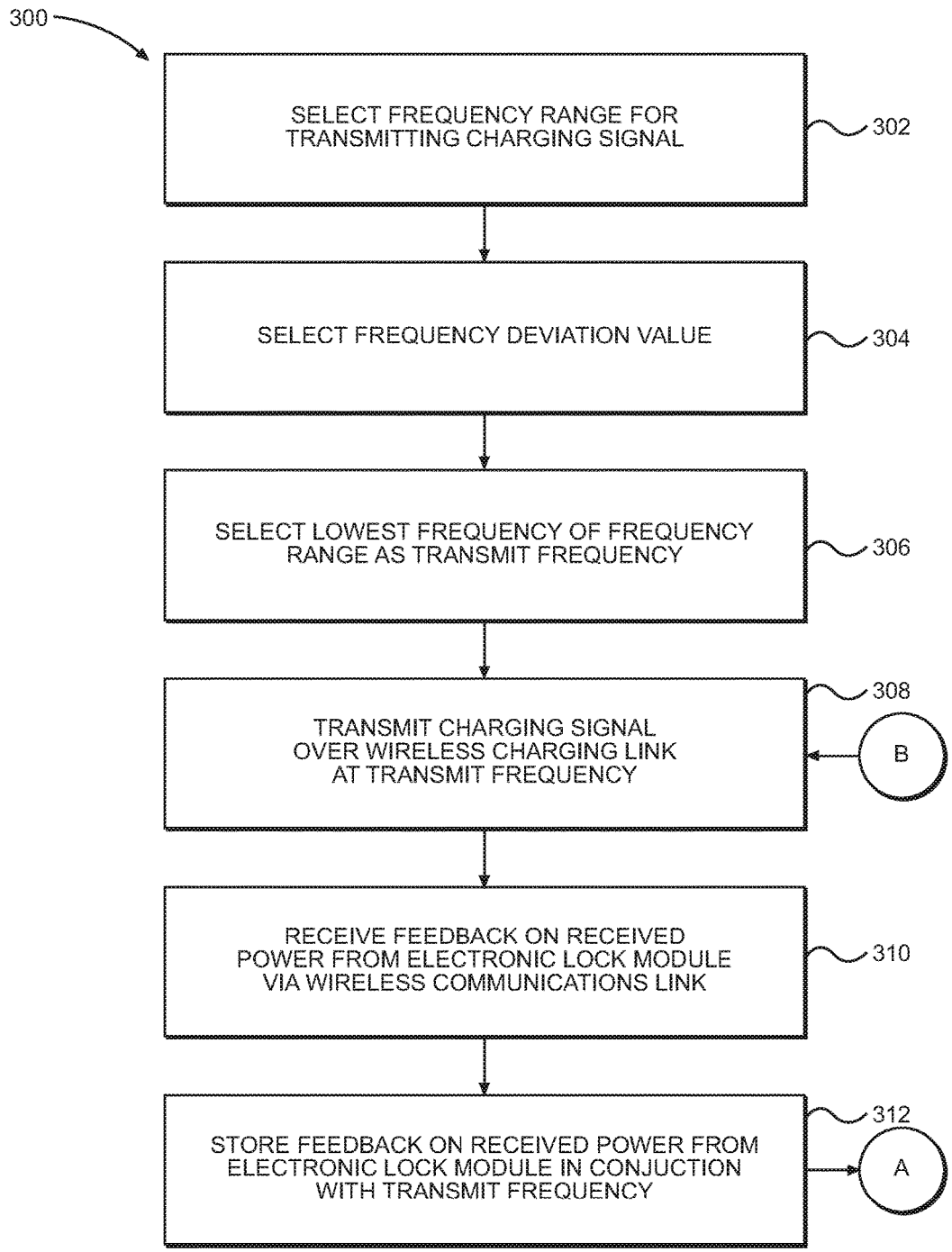
FIGS. 3A and 3B represent a flow diagram of a method that determines the transmission frequency at which maximum power transfer occurs across a wireless charging link.

FIG. 3A represents a flow diagram of a method 300 that determines the transmission frequency at which maximum power transfer occurs across a wireless charging link. At 302, the electronic control module selects a frequency range for transmitting the charging signal. In some embodiments where the wireless charging link is an inductively coupled charging link, the frequency range for transmitting the charging signal is selected to be in a range around the approximate resonance frequency of the inductively coupled wireless charging link. For example, in embodiments where the wireless charging link is an inductively coupled charging link, the transmission frequency has a nominal value of 125 kHz subject to autotuning, while the receiver is tuned to a frequency of 160 kHz. Next, at 304, the electronic control module selects a frequency deviation value. This frequency deviation value is used as a step to vary the transmission frequency for transmitting the charging signal over the transmission frequency range, and is selected based on parameters that include the number of frequency steps required by the system, the frequency resolution of the numerically controlled oscillator and so on. In some embodiments where the wireless charging link is an inductively coupled charging link, the frequency deviation value may be any value within a range of, for example, 10 Hz to 100 Hz. At 306, the electronic control module selects the lowest frequency of the frequency range as the transmission frequency, also known as the transmit frequency, and programs the numerically controlled oscillator to generate the charging signal at this transmission frequency. Next, at 308, the electronic control module transmits the charging signal over the wireless charging link at the transmit frequency. At 310, the electronic control module receives feedback from the electronic lock module regarding the received power, via the wireless communications link. At 312, the electronic control module stores the feedback on the received power from the electronic lock module in conjunction with the transmit frequency. The method then proceeds to A and continues to FIG. 3B as described below.

Figure 3B:
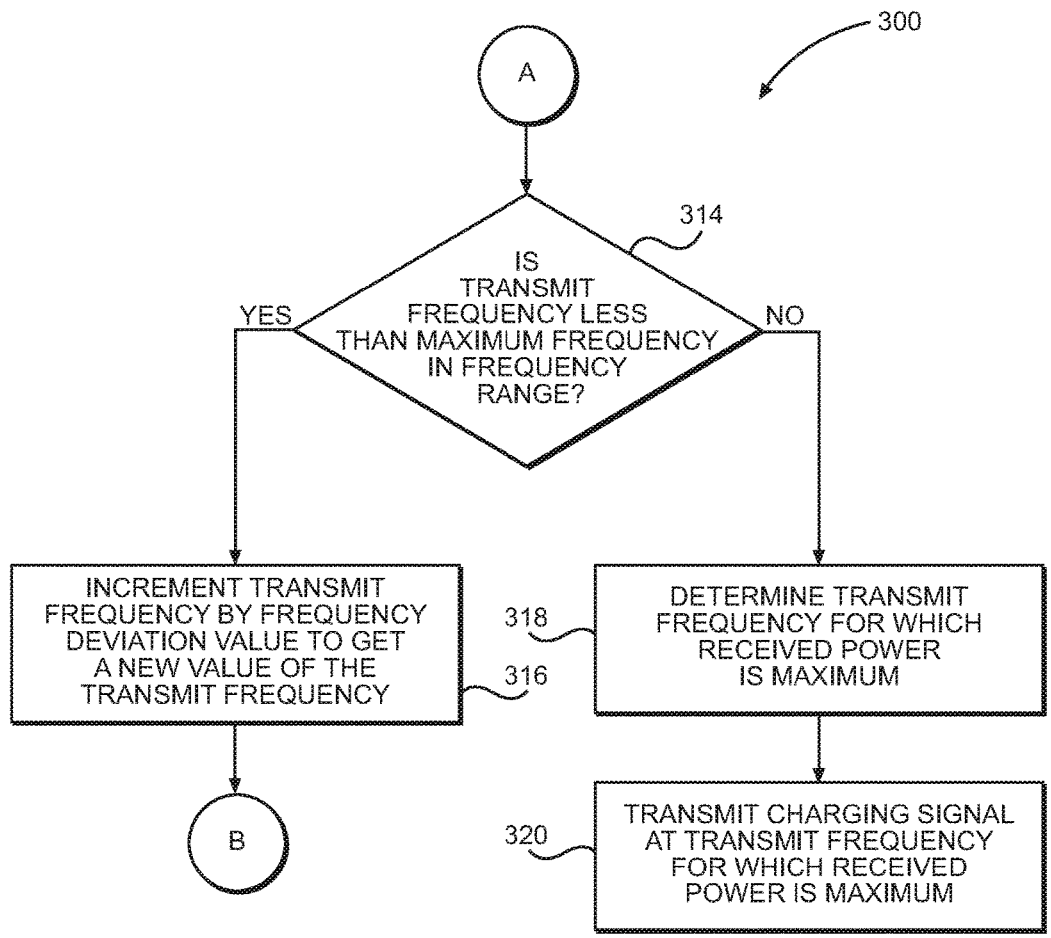

FIG. 3B is a continuation from FIG. 3A, of the method 300. Starting at A, the method proceeds to 314, where the electronic control module checks if the transmit frequency is less than the maximum frequency in the frequency range. If the transmit frequency is less than the maximum frequency in the frequency range, then the method proceeds to 316, where the electronic control module increments the transmit frequency by the frequency deviation value to get a new value of the transmit frequency. The method then goes to B, and back to 308, where the process continues. At 314, if the transmit frequency is not less than the maximum frequency in the frequency range, then the method proceeds to 318, where the electronic control module determines the transmit frequency for which the received power is maximum based on the stored feedback based on the power received by the electronic lock module. Finally, at 320, the electronic control module programs the numerically controlled oscillator to generate the transmit frequency for which the power received by the electronic lock module is maximum, and the electronic control module transmits the charging signal at the transmit frequency for which the received power is maximum.

As an alternative embodiment, the electronic control module may be configured to start at the highest frequency in the frequency range and use a negative value of the frequency deviation to decrement the transmit frequency at every step. In still other embodiments, the electronic control module may be configured to select between a positive value of the frequency deviation and a negative value of the frequency deviation, corresponding to either the process of starting at the lowest frequency in the frequency range or the process of starting at the highest frequency in the frequency range respectively. In still other embodiments, the electronic control module may scan the frequency range by pseudo-randomly varying the transmit frequency at each step, or by using some other nonlinear method of transmit frequency selection, and scanning through a range of frequencies to determine the transmit frequency for which the received power is maximum.

Figure 4:
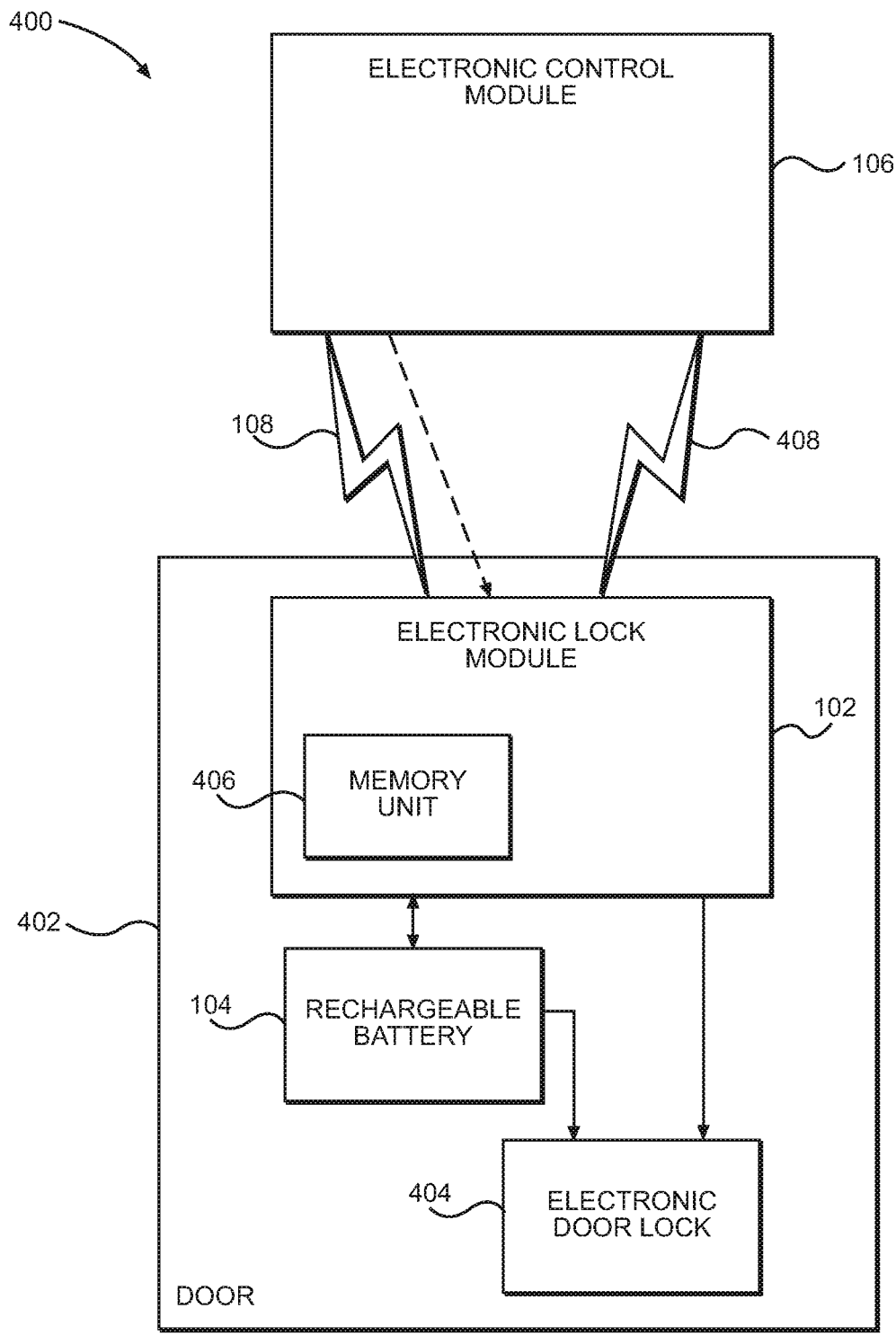
FIG. 4 represents a block diagram that depicts an embodiment of a wireless battery charging system that includes a memory unit.

FIG. 4 represents a block diagram 400 that depicts an embodiment of a wireless battery charging system that includes a memory unit. In some embodiments, electronic lock module 102 is disposed within a door 402. Electronic control module 106 transmits a wireless charging signal to the electronic lock module 102 via wireless charging link 108. In some embodiments, electronic control module 106 may be associated with a door frame (not shown), where the door frame is associated with door 402. A wireless communications link 408 is generated between electronic control module 106 and electronic lock module 102. In some embodiments, wireless communications link 408 is a bidirectional communications link, and may be an RF communications link at a frequency of 400 MHz.

The electronic lock module 102 receives the charging signal from the electronic control module 106 via the wireless charging link 108, and uses the charging signal to charge a rechargeable battery 104, also associated with door 402. The rechargeable battery 104 supplies power to an electronic door lock 404, where the electronic door lock can lock or unlock the door 402 based on commands from electronic lock module 102. In some embodiments, electronic lock module 102 includes a memory unit 406. Memory unit 406 may be used to store, for example, user authentication data for a designated set of users. In some embodiments, under normal operation, user authentication is provided by a remote host (also known as a host controller), and upon successful authentication, the electronic control module 106 transmits an authorization signal to the electronic lock module 102 via wireless communications link 408. Electronic lock module 102 uses the authorization signal to command the electronic door lock 404 to unlock the door to provide access to the user. In some embodiments, user authentication data stored in memory unit 406 may be used to provide failsafe access to the users whose data is stored in memory unit 406, in the event that the host controller is unable to provide successful authentication (for example, in the event of a power failure). Other cases where the user authentication data stored in memory unit 406 may be used to provide failsafe access to the users whose data is stored in memory unit 406 may include but are not limited to one or more of the following:

Failure of the communications link between the electronic control module 106 and the host controller.
Failure of the wireless charging link 108.
Failure of the wireless communications link 408.

A credential reader (not shown) may be electrically coupled to the electronic lock module 102 and activated when, for example, the electronic lock module 102 does not receive any signal (such as a polling signal) over the wireless communications link 408 from the electronic control module 106 for a certain amount of time (which may indicate a power failure or a malfunction), where the credential reader may include one or any combination of a numeric keypad, radio frequency identification (RFID) reader, card reader, magnetic strip card reader, barcode card reader, biometric reader and so on, and also devices that may communicate with mobile devices such as smartphones using communication protocols that include but are not limited to infrared (IR) and near field communication (NFC). In this case, an authorized user can, for example, either enter a numeric code on the numeric keypad or slide their access card and be granted access by the electronic lock module 102 based on the user authentication data stored in memory unit 406. Other user-related data stored in memory unit 406 includes but is not limited to the duration for which a user's credentials are valid, on what days of the week a user's credentials are valid, the security level of a particular user and so on.

Once the electronic control module 106 resumes transmitting signals to the electronic lock module 102, the system reverts back to its normal mode of operation, where the electronic lock module 102 relies on authentication confirmation signals from electronic control module 106 for user access.

Figure 5:
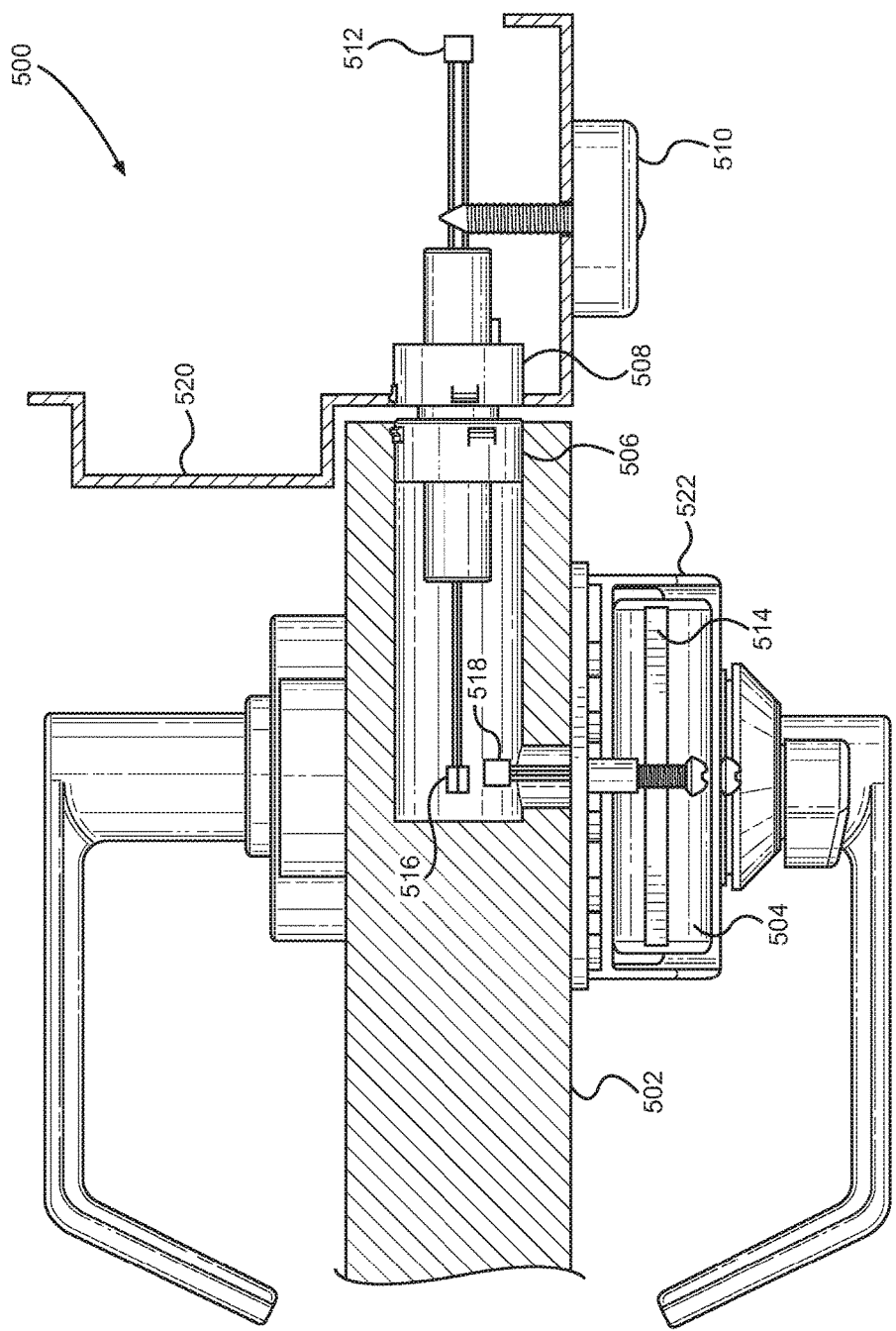
FIG. 5 depicts a view of an installation of the wireless battery charging unit within a door and the associated door frame.

FIG. 5 depicts a view 500 of an installation of the wireless battery charging unit within a door and the associated door frame. In some embodiments, the wireless charging link is a unidirectional inductively coupled link generated from a transmitter coil 508 disposed in a door frame 520, to a receiver coil 506 disposed in a door 502. In some embodiments, the maximum distance between the transmitter coil 508 and the receiver coil 506 is approximately 2 inches. If the distance between the transmitter coil 508 and the receiver coil 506 is greater than 2 inches, there may be a significant loss in the power coupled from the transmitter coil 508 to the receiver coil 506. This loss in power coupling can be used to determine whether the door is open. From a security standpoint, if the door is left open for greater than a specified amount of time, an alarm can be triggered based on the amount of time for which the loss in power coupling occurs. The loss in power coupling associated with an open door can also be used to implement a door contact, where the presence of maximum power coupling between the transmitter coil 508 and the receiver coil 506 can be used as a confirmation that the door is shut, eliminating the need to install a dedicated door switch for this purpose.

In some embodiments, the transmission frequency associated with the inductive coupling is approximately 125 kHz. FIG. 5 also illustrates a rechargeable battery 504 (corresponding to rechargeable battery 104), and an electronic circuit board 514 on which the necessary electronic components comprising the electronic lock module 102 are placed. In some embodiments, the electronic components placed on electronic circuit board 514 may include any combination of processors and memory units. In some embodiments, electronic circuit board 514 and rechargeable battery 504 may be disposed within an electronic door lock 522, corresponding to electronic door lock 404. In other embodiments, electronic circuit board 514 and rechargeable battery 504 may be disposed within the door 502. In some embodiments, the door 502 may be comprised of any one of wood, steel or aluminum. In the event that door 502 is a steel door, a hole of approximately ¾-inch diameter drilled into the door 502 may be used to install the receiver coil 506.

FIG. 5 illustrates an embodiment 510 of an electronic control module similar to electronic control module 106. An electrical connector 518 is configured to physically and electrically couple with an electrical connector 516. When electrical connector 518 and electrical connector 516 are connected, electrical power received by receiver coil 506 is transmitted to the electronic circuit board 514. An electrical connector 512 is configured to physically and electrically couple with a corresponding electrical connector (not shown) associated with electronic control module 510. In some embodiments, electrical connector 512 may be directly connected to a corresponding mating connector on electronic control module 510. Similarly, electrical electronic circuit board 514 may be configured to directly interface with electrical connector 516.

In some embodiments, the electronic circuit board 514 is configured to perform several functions including, but not limited to, routing the electrical power received to recharge rechargeable battery 504 and command the electronic door lock 522 to lock or unlock. In other embodiments, rechargeable battery may power either one or both of the electronic circuit board 514 and the electronic door lock 522.

Figure 6:
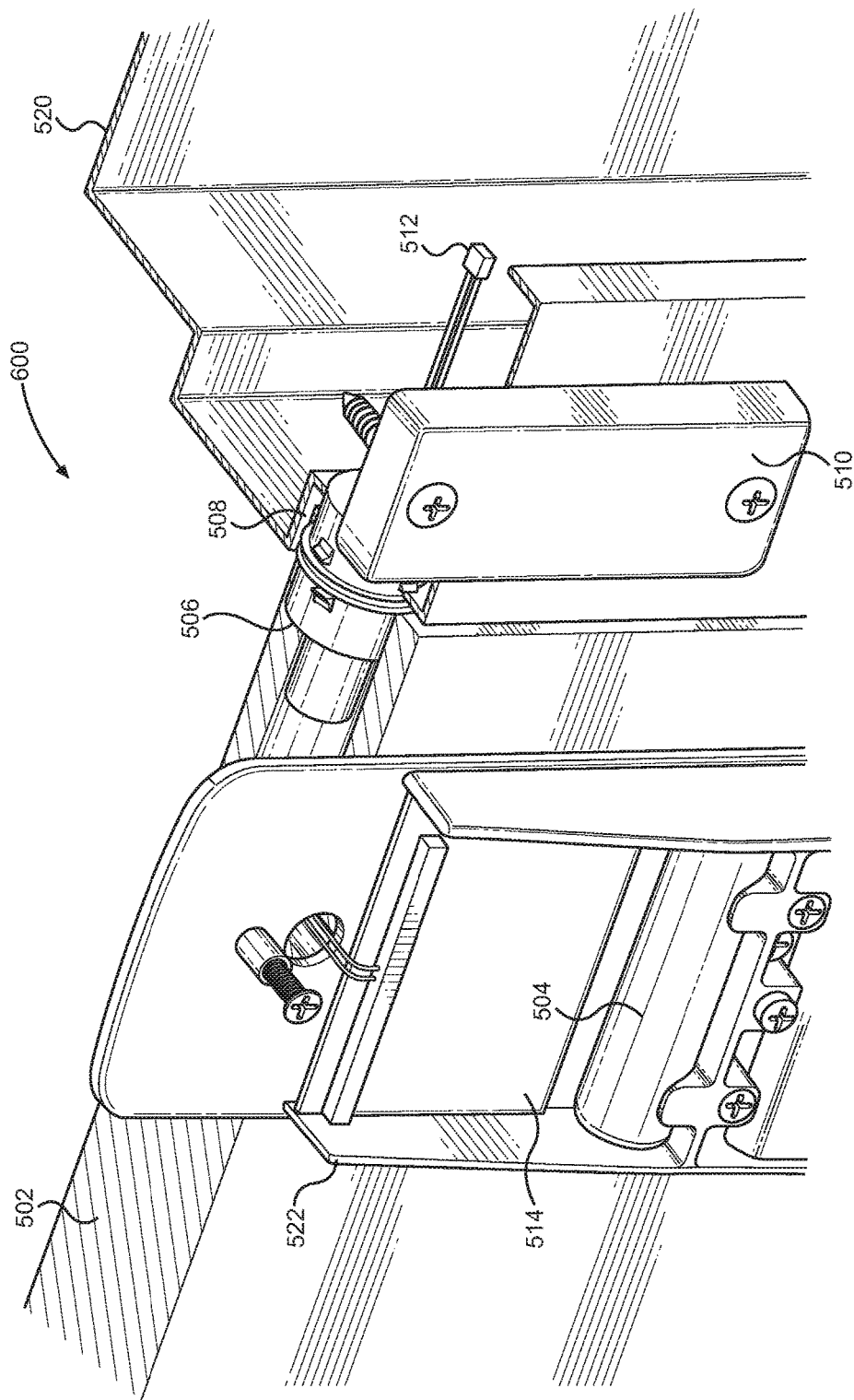
FIG. 6 depicts an alternate view of an installation of the wireless battery charging unit within a door and the associated door frame.

FIG. 6 depicts an alternate view 600 of an installation of the wireless battery charging unit within a door and the associated door frame. In some embodiments, the wireless charging link is a unidirectional inductively coupled link generated from transmitter coil 508 disposed in door frame 520, to receiver coil 506 disposed in door 502. In some embodiments, the maximum distance between the transmitter coil 508 and the receiver coil 506 is approximately 2 inches. In some embodiments, the transmission frequency associated with the inductive coupling is approximately 125 kHz. Also shown in this diagram are rechargeable battery 504 (corresponding to rechargeable battery 104), and electronic circuit board 514 on which the necessary electronic components comprising the electronic lock module 102 are placed. In some embodiments, the electronic components placed on electronic circuit board 514 may include any combination of processors and memory units. In some embodiments, electronic circuit board 514 and rechargeable battery 504 may be disposed within electronic door lock 522, corresponding to electronic door lock 404. In other embodiments, electronic circuit board 514 and rechargeable battery 504 may be disposed within the door 502.

FIG. 6 illustrates an embodiment 510 of the electronic control module similar to electronic control module 106. Electrical connector 512 is configured to physically and electrically couple with a corresponding electrical connector (not shown) associated with electronic control module 510. In some embodiments, electrical connector 512 may be directly connected to a corresponding mating connector on electronic control module 510.

Figure 7:
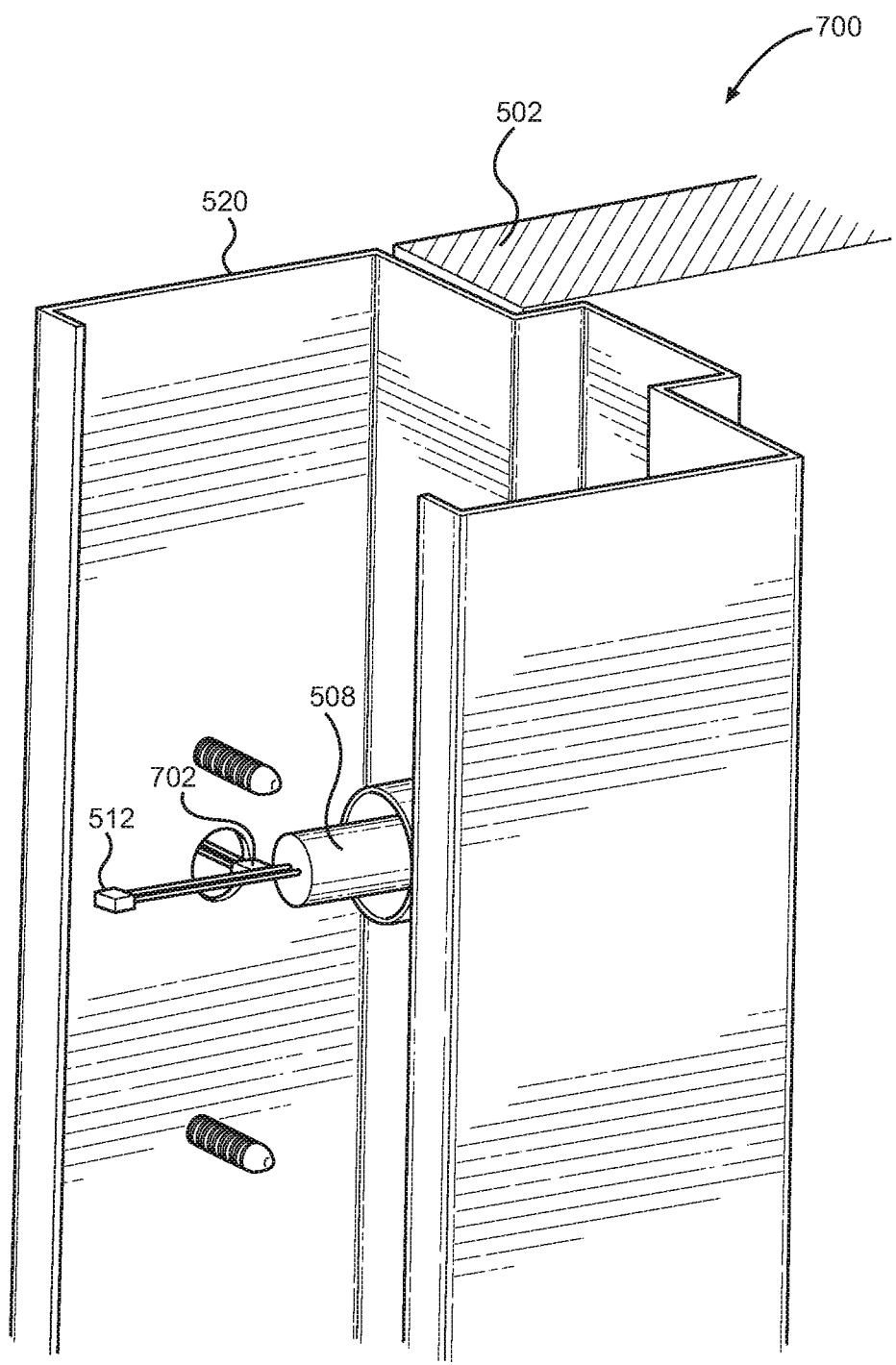
FIG. 7 depicts an alternate view of an installation of the wireless battery charging unit within a door and the associated door frame.

FIG. 7 depicts an alternate view 700 of an installation of the wireless battery charging unit within a door and the associated door frame. FIG. 7 shows transmitter coil 508 associated with door frame 520, where door frame 520 is associated with door 502. Electrical connector 512 is configured to physically and electrically couple with an electrical connector 702, wherein electrical connector 702 is electrically coupled to electronic control module 106.

Figure 8:
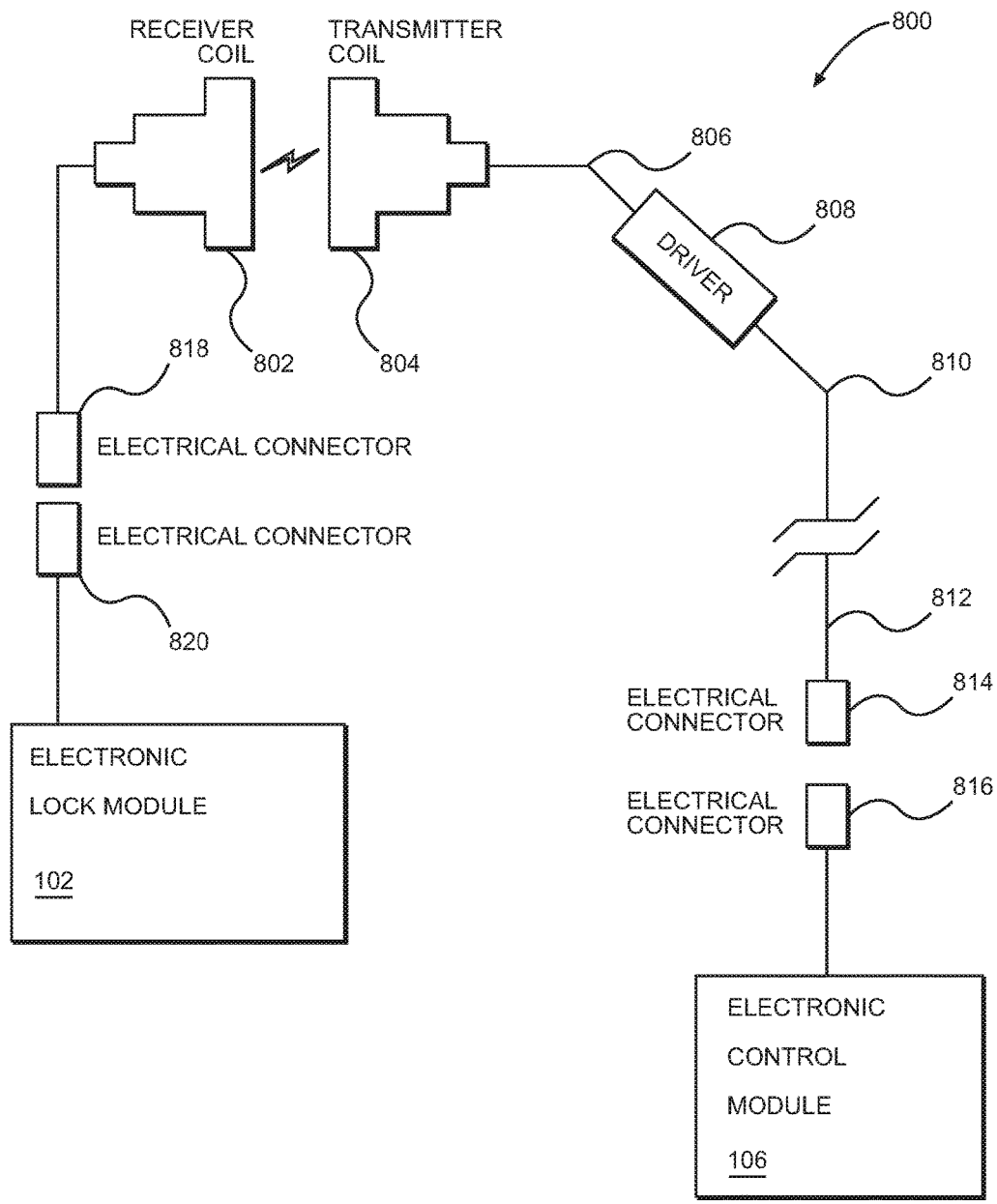
FIG. 8 depicts an embodiment of the wireless battery charging system that is configured to compensate for any signal degradation that might occur during signal transmission.

FIG. 8 depicts an embodiment of the wireless battery charging system 800 that is configured to compensate for any signal degradation that might occur during signal transmission. In some embodiments, electronic control module 106 may be physically located at a distance from a transmitter coil 804 such that a signal transmitted from the electronic control module 106 to the transmitter coil 804 may be degraded due to, for example, capacitance effects introduced by conducting cables. In some embodiments, the signal transmitted from the electronic control module 106 to the transmitter coil 804 may be a square wave signal. In some embodiments, data modulation methods including, but not limited to, on/off keying (OOK), amplitude shift keying (ASK), frequency shift keying and so on may be used to modulate digital data onto the signal transmitted from the electronic control module 106 to the transmitter coil 804. In other embodiments, the distance of the electronic control module 106 from the transmitter coil 804 may be 100 feet or greater. Some embodiments may include a driver module 808 that is configured to compensate for any degradation associated with the signal transmitted from the electronic control module 106 to the transmitter coil 804. Driver module 808 may be electrically coupled to transmitter coil 804 via a conducting cable 806 such that the distance between the driver module 808 and the transmitter coil 804 is 12 inches or less. Driver module 808 may also be electrically coupled to the electronic control module 106 via a conducting cable 810, shown extended at 812, and via an electrical connector 814 which mates with an electrical connector 816 which, in turn, is electrically connected to electronic control module 106.

With regards to signal flow, the electronic control module 106 generates a signal that is transmitted to the driver module 808. Driver module 808 then compensates for any degradation in the transmitted signal, and transmits the compensated signal to transmitter coil 804, which then transmits this signal to a receiver coil 802 as a wireless charging signal. Receiver coil 802 receives the wireless charging signal and transmits this wireless charging signal to electronic lock module 102, where the electrical connection between receiver coil 802 and electronic lock module 102 is completed via an electrical connector 818 and an electrical connector 820.

Figure 9:
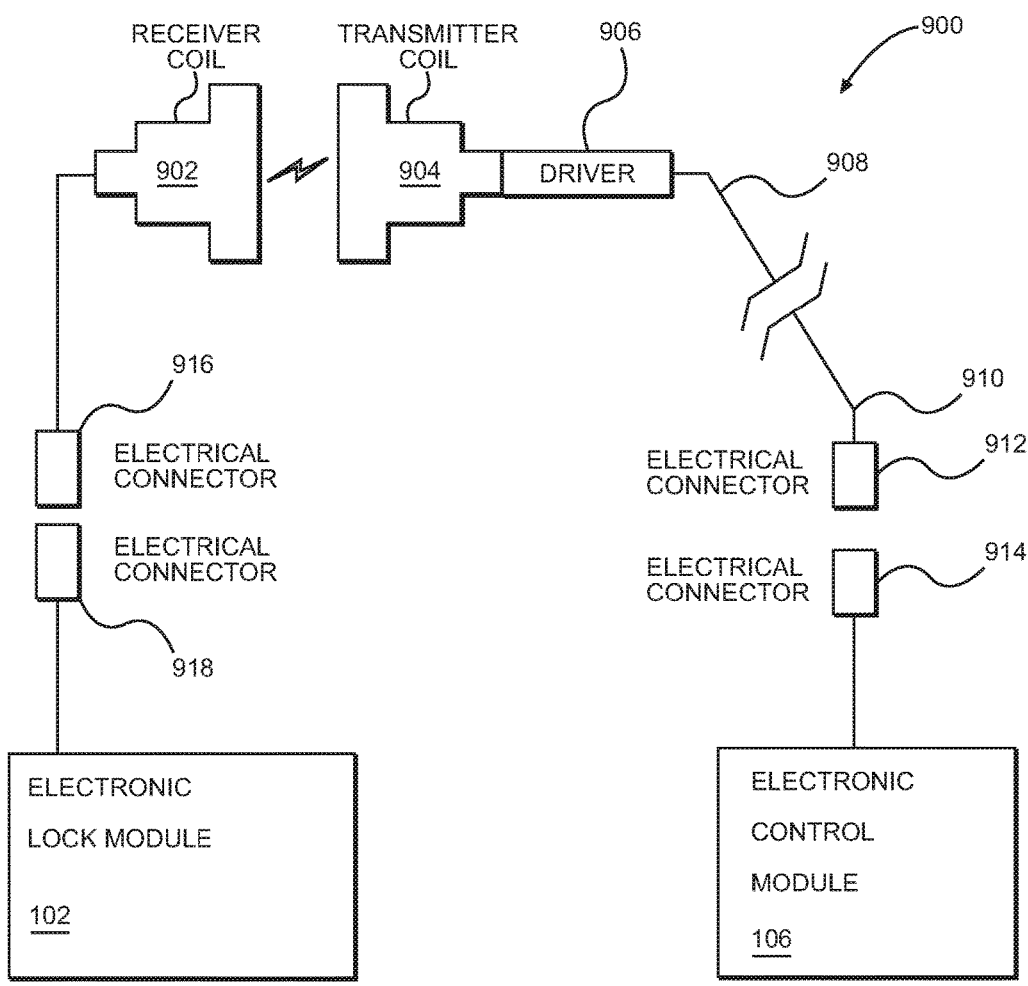
FIG. 9 depicts another embodiment of the wireless battery charging system that is configured to compensate for any signal degradation that might occur during signal transmission.

FIG. 9 depicts another embodiment of a wireless battery charging system 900 that is configured to compensate for any signal degradation that might occur during signal transmission. In some embodiments, electronic control module 106 may be physically located at a distance from a transmitter coil 904 such that a signal transmitted from the electronic control module 106 to the transmitter coil 904 may be degraded due to, for example, capacitance effects introduced by conducting cables. In some embodiments, the signal transmitted from the electronic control module 106 to the transmitter coil 904 may be a square wave signal. In some embodiments, data modulation methods including, but not limited to, on/off keying (OOK), amplitude shift keying (ASK), frequency shift keying and so on may be used to modulate digital data onto the signal transmitted from the electronic control module 106 to the transmitter coil 904. In other embodiments, the distance of the electronic control module 106 from the transmitter coil 904 may be 100 feet or greater. Some embodiments may include a driver module 906, where the driver module 906 is configured to compensate for any degradation associated with the signal transmitted from the electronic control module 106 to the transmitter coil 904. In some embodiments, driver module 906 may be electrically coupled to transmitter coil 904, where the driver module 906 and the transmitter coil 904 are in physical proximity to each other. Driver module 906 may also be electrically coupled to the electronic control module 106 via a conducting cable 908, shown extended at 910, and via an electrical connector 912 which mates with an electrical connector 914 which, in turn, is electrically connected to electronic control module 106.

With regards to signal flow, the electronic control module 106 generates a signal that is transmitted to the driver module 906. Driver module 906 then compensates for any degradation in the transmitted signal, and transmits the compensated signal to transmitter coil 904, which then transmits this signal to a receiver coil 902 as a wireless charging signal. Receiver coil 902 receives the wireless charging signal and transmits this wireless charging signal to electronic lock module 102, where the electrical connection between receiver coil 902 and electronic lock module 102 is completed via an electrical connector 916 and an electrical connector 918.

Figure 10:
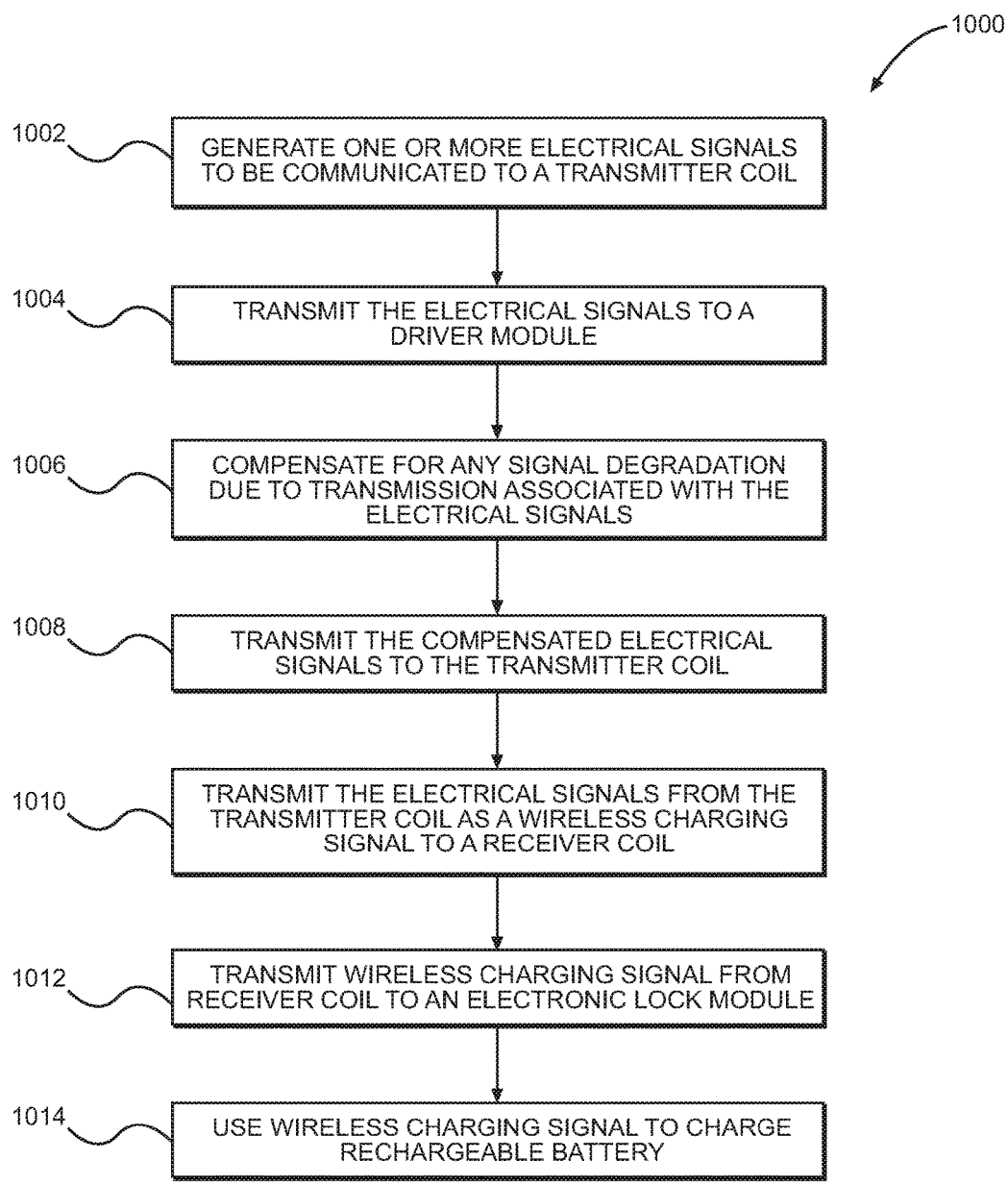
FIG. 10 represents a flow diagram depicting an embodiment of a method for compensating for any signal degradation that might occur during signal transmission associated with the wireless battery charging system.

FIG. 10 represents a flow diagram of a method 1000 for compensating for any signal degradation that might occur during signal transmission associated with the wireless battery charging system. At 1002, the method generates one or more electrical signals to be transmitted to a transmitter coil. In some embodiments, the electrical signals may be generated by an electronic control module such as electronic control module 106. In other embodiments, the electrical signals may be any combination of signals that may include square wave signals. Next, at 1004, the method transmits the electrical signals to a driver module. In some embodiments, the driver module may be a driver module such as driver module 808 or driver module 906. At 1006, the driver module compensates for any signal degradation that may occur due to the transmission associated with the electrical signals. In some embodiments, the driver module is comprised of components that may include a power amplifier. In operation, a signal is applied to a length of conducting cable.

Due to the inherent capacitance of the conducting cable, the signal becomes attenuated. The longer the conducting cable, the greater the attenuation, with the signal attenuation eventually reaching a level that is insufficient to power the system. The adverse effects of the capacitance associated with extended lengths of the conducting cable thus need to be compensated for. With no amplifier, the cable capacitance changes the resonant circuit which, in turn, reduces the performance of the system (such as efficient and effective power coupling from the transmitter coil to the receiver coil). Including a power amplifier as a component of the driver module allows the adverse effects of the capacitance of the conducting cable to be compensated for, and the associated degradation in the signal is reduced.

At 1008, the method transmits the compensated electrical signals from the driver module to the transmitter coil. At 1010, the transmitter coil transmits the electrical signals as a wireless charging signal to a receiver coil. Next, the method proceeds to 1012, where the receiver coil receives the wireless charging signal from the transmitter coil and transmits this wireless charging signal to an electronic lock module. In some embodiments, the electronic lock module may be an electronic lock module such as electronic lock module 102. Finally, at 1014, the electronic lock module uses the wireless charging signal to recharge a rechargeable battery, such as rechargeable battery 104.

Figure 11:
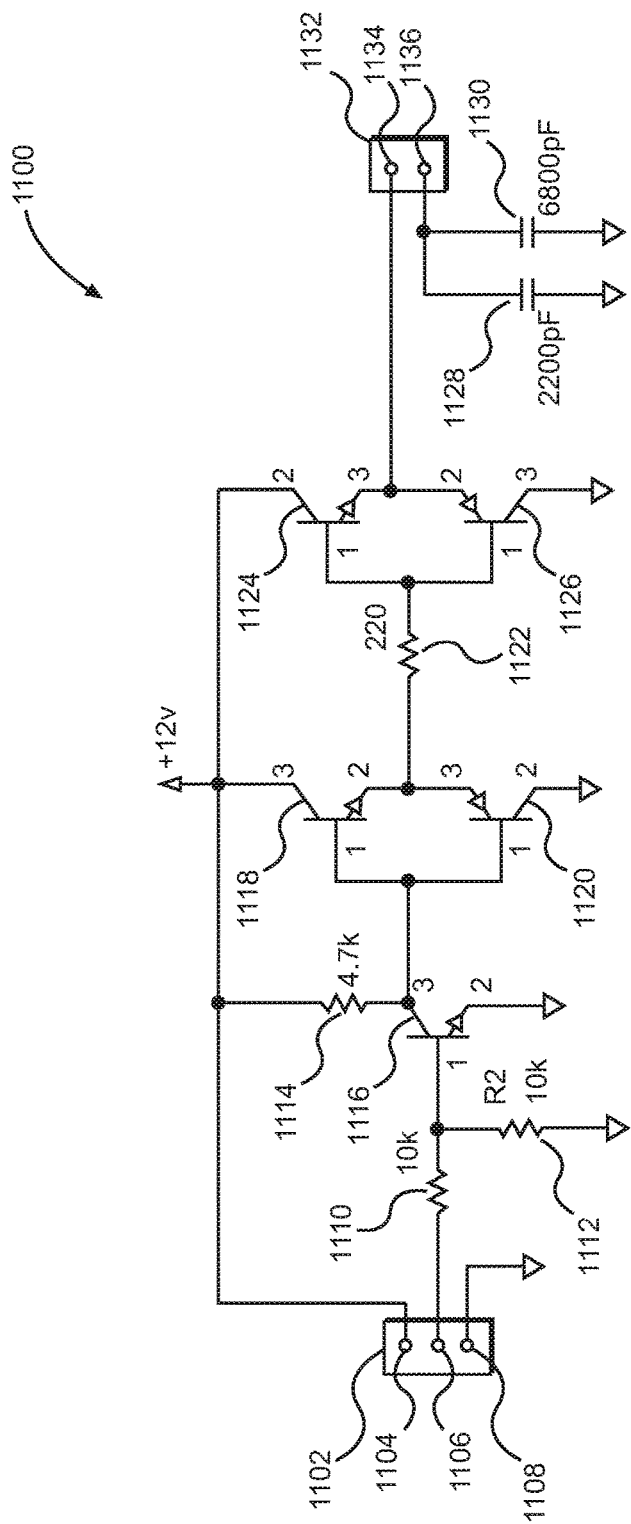
FIG. 11 depicts a circuit diagram of a driver associated with the wireless battery charging system, where the driver is configured to compensate for any signal degradation that might occur during signal transmission.

FIG. 11 depicts a circuit diagram 1100 of a driver module (e.g., driver module 808 and 906) associated with the wireless battery charging system, where the driver module is configured to compensate for any signal degradation that might occur during signal transmission. In some embodiments, the circuit diagram 1100 may correspond to a realization of a driver module such as 808. In some embodiments, the electrical circuit 1100 includes an electrical connector 1102 that is configured to receive three electrical signals. In some embodiments, these three electrical signals may be generated by an electronic control module such as electronic control module 106. The first electrical signal is a power signal that supplies power to the electrical circuit 1100, and is received at pin 1104 of the electrical connector 1102. In some embodiments, the power signal may be a positive 12-Volt DC signal that powers the electrical circuit 1100. The second electrical signal is a charging signal, and is received at pin 1106 of the electrical connector 1102. In some embodiments, the charging signal may be a square wave signal at a frequency of 125 kHz. The third electrical signal is a reference, or ground signal, and is received at pin 1108 of the electrical connector 1102.

The charging signal is used as an input signal to an NPN transistor 1116, with a resistor 1110, a resistor 1112 and a resistor 1114 serving as biasing resistors for NPN transistor 1116. In some embodiments, resistor 1110 and resistor 1112 may each have a value of 10 kΩ, while resistor 1114 may have a value of 4.7 kΩ. In the event that the charging signal is a square wave, the combination of NPN transistor 1116, resistor 1110, resistor 1112 and resistor 1114 functions as a squaring circuit that compensates for any degradation in the charging signal that may have been caused during transmission by, for example, the capacitive effects of the transmission cable. The output of NPN transistor 1116 is input to a class B push-pull amplifier comprised of an NPN transistor 1118 and a PNP transistor 1120. This class B push-pull amplifier amplifies the power of the input signal and transmits the amplified signal to the final amplifier stage comprised of a resistor 1122, an NPN power transistor 1124, and a PNP power transistor 1126. In some embodiments, resistor 1122 has a value of 220Ω. The final amplifier stage generates a signal of sufficient power to drive a resonant circuit comprised of a resonating capacitor 1128 and a resonating capacitor 1130. In some embodiments, resonating capacitor 1128 may have a value of 2200 pF, while resonating capacitor 1130 may have a value of 6800 pF. The function of the resonant circuit is to convert the input signal into a sinusoidal signal that is suitable for transmission over a radio frequency (RF channel) at a frequency that corresponds to the resonant frequency of the resonant circuit. In the event that the input signal is data-modulated by any digital data signal, the corresponding data modulation is preserved in the sinusoidal output of the resonant circuit. For example, if the input signal to the resonant circuit is a data-modulated square wave signal, then the output of the resonant circuit is a sinusoidal signal modulated by the data signal. The electrical circuit 1100 also has an output connector 1132. The output of the final amplifier stage is connected to pin 1134 of the output connector 1132, while the resonant circuit is connected to pin 1136 of the output connector 1132. In some embodiments, pin 1134 of the output connector may be directly connected to a transmitter coil such as transmitter coil 804.

Circuit 1100 functions as a class B device. Since a class B amplifier draws maximum current at the resonance condition associated with the resonant circuit, any unintentional errors in the installation process associated with the wireless battery charging system that serve to detune the resonant circuit will result in less current being drawn, making it impossible to generate excessive heat which could damage the equipment and possibly start a fire. At worst, the system will be non-operational until the problem associated with the installation is corrected. In this way, the system has a built-in level of safety.

FIG. 12A depicts an embodiment 1200 of a transmitter coil associated with the wireless battery charging system. In some embodiments, the transmitter coil may be similar to transmitter coil 508. The embodiment 1200 shows the transmitter coil being comprised of an outer hollow cylinder 1201 and an inner hollow cylinder 1206, where the outer hollow cylinder 1201 and the inner hollow cylinder 1206 are substantially coaxial and the inner diameter of the outer hollow cylinder 1201 is greater than the outer diameter of the inner hollow cylinder 1206. In some embodiments, the outer hollow cylinder 1201 and the inner hollow cylinder 1206 are made of a plastic material. In some embodiments, the outer hollow cylinder 1201 may have an outer diameter of ¾ inch (0.75 inches), while the inner hollow cylinder 1206 may have an outer diameter of 0.45 inches. Outer hollow cylinder 1201 and inner hollow cylinder 1206 may be configured such that the inner hollow cylinder 1206 is rigidly attached to the outer hollow cylinder 1201 using, for example, mating ridges or any similar physical coupling method that relies, for example, on friction to hold the assembly comprising the outer hollow cylinder 1201 and the inner hollow cylinder 1206 together. In the embodiment 1200 four strips of magnetically permeable material such as ferrite, a ferrite strip 1202*a*, a ferrite strip 1202*b*, a ferrite strip 1202*c* and a ferrite strip 1202*d* are disposed within the space between the outer hollow cylinder 1201 and the inner hollow cylinder 1206. In some embodiments, ferrite strip 1202*a* and ferrite strip 1202*c* are placed diametrically opposite each other, while ferrite strip 1202*b* and ferrite strip 1202*d* are placed diametrically opposite each other such that the diametric line associated with ferrite strip 1202*a* and ferrite strip 1202*c* and the diametric line associated with ferrite strip 1202*b* and ferrite strip 1202*d* are substantially orthogonal. In some embodiments, ferrite strip 1202*a*, ferrite strip 1202b, ferrite strip 1202c and ferrite strip 1202d may be individually adhesively affixed to the assembly comprising outer hollow cylinder 1201 and inner hollow cylinder 1206. In some embodiments, ferrite strip 1202a, ferrite strip 1202b, ferrite strip 1202c and ferrite strip 1202d may be any combination of ferrite or any other magnetically permeable material.

An electrical coil 1205 is disposed within the assembly comprising outer hollow cylinder 1201 and inner hollow cylinder 1206 such that electrical coil 1205 is substantially coaxial with the assembly comprising outer hollow cylinder 1201 and inner hollow cylinder 1206. Specifically, electrical coil 1205 is disposed coaxially within the hollow cylinder 1206 such that the combination of ferrite strip 1202a, ferrite strip 1202b, ferrite strip 1202c and ferrite strip 1202d at least partially surrounds the electrical coil 1205. In some embodiments, electrical coil 1205 is electrically coupled to an electrical cable 1204, where electrical cable 1204 is configured to transmit power and data electrical signals from an electronic control module such as electronic control module 106 to the electrical coil 1205. The electrical coil 1205 converts the power and data electrical signals to magnetic signals, which are then received by a receiver coil such as receiver coil 506, where receiver coil 506 is located in the proximity of transmitter coil 1200.

In some embodiments, electrical coil 1205 may be comprised of an electrically conducting wire such as copper wire wound around a magnetically permeable core such as a ferrite core. In other embodiments, the electrical coil 1205 may be comprised of an electrically conducting wire such as copper wire wound around an air core. In other embodiments, electrical coil 1205 has a diameter of ⅛ inch or larger.

The embodiment 1200 is especially advantageous in situations where a transmitter coil such as transmitter coil 508 is installed in a door frame that is substantially comprised of a metal such as steel. Installing a transmitter coil in a steel door frame may result in a loss of electrical power coupling efficiency as a certain amount of electrical power generated by the transmitter coil may be dissipated within the steel door frame as, for example eddy current losses. Due to this, the power received by the receiver coil is reduced to the point where this received power may be insufficient to charge the rechargeable battery. Installing the transmitter coil in a door frame may involve having to, for example, drill a hole in the door frame. Safety regulations mandated by organizations such as Underwriters Laboratories (UL) may limit the size of the hole that can be drilled in the door frame to, for example, ¾ inch in diameter. Therefore, there is a physical constraint on the dimensions of the transmitter coil which, in turn, limits the amount of electromagnetic power that the transmitter coil can handle and transmit. The combination of the physical constraints imposed by safety regulations coupled with the lossy effects of a door frame comprised of a material such as steel thus presents a challenge with regards to the amount of power that can be effectively transmitted from the transmitter coil to the receiver coil.

Surrounding the electrical coil 1205 by magnetically permeable material such as ferrite strip 1202a, ferrite strip 1202b, ferrite strip 1202c and ferrite strip 1202d reduces the eddy current losses, since the combination of ferrite strip 1202a, ferrite strip 1202b, ferrite strip 1202c and ferrite strip 1202d serves to direct the magnetic field lines generated by electrical coil 1205 away from the door frame. In other words, the magnetic field lines generated by electrical coil 1205 flow through the magnetically permeable enclosure created by the combination of ferrite strip 1202a, ferrite strip 1202b, ferrite strip 1202c and ferrite strip 1202d rather than flowing into the door frame and being dissipated as losses. In some embodiments, the diameter of the electrical coil 1205 may be up to half the diameter of the hole drilled in the door frame, as larger electrical coil diameters are associated with greater eddy current losses. In other embodiments, the electrical coil associated with the receiver coil (not shown) may be an airwound coil (an electrical coil with an air core) with a diameter that may range from ⅜ inch to 1 inch.

FIG. 12B depicts an embodiment 1208 of a transmitter coil associated with the wireless battery charging system. In some embodiments, the transmitter coil may be similar to transmitter coil 508. The embodiment 1208 shows the transmitter coil being comprised of outer hollow cylinder 1201 and inner hollow cylinder 1206, where the outer hollow cylinder 1201 and the inner hollow cylinder 1206 are substantially coaxial and the inner diameter of the outer hollow cylinder 1201 is greater than the outer diameter of the inner hollow cylinder 1206. In some embodiments, the outer hollow cylinder 1201 and the inner hollow cylinder 1206 are made of a plastic material. In some embodiments, the outer hollow cylinder 1201 may have an outer diameter of ¾ inch (0.75 inches), while the inner hollow cylinder 1206 may have an outer diameter of 0.45 inches. Outer hollow cylinder 1201 and inner hollow cylinder 1206 may be configured such that the inner hollow cylinder 1206 is rigidly attached to the outer hollow cylinder 1201 using, for example, mating ridges or any similar physical coupling method that relies, for example, on friction to hold the assembly comprising the outer hollow cylinder 1201 and the inner hollow cylinder 1206 together. In the embodiment 1208 a single strip of magnetically permeable material such as ferrite, herein referred to as ferrite strip 1210, is disposed within the space between the outer hollow cylinder 1201 and the inner hollow cylinder 1206 such that the ferrite strip 1210 is rolled into a cylindrical shape to fit within the cylindrical space within outer hollow cylinder 1201 and inner hollow cylinder 1206. In some embodiments, ferrite strip 1210 may be adhesively affixed to the assembly comprising outer hollow cylinder 1201 and inner hollow cylinder 1206. In some embodiments, ferrite strip 1210 may be replaced by a strip comprised of another magnetically permeable material.

Electrical coil 1205 is disposed within the assembly comprising outer hollow cylinder 1201 and inner hollow cylinder 1206 such that electrical coil 1205 is substantially coaxial with the assembly comprising outer hollow cylinder 1201 and inner hollow cylinder 1206. Specifically, electrical coil 1205 is disposed coaxially within the hollow cylinder 1206 such that the ferrite strip 1210 at least partially surrounds the electrical coil 1205. In some embodiments, electrical coil 1205 is electrically coupled to an electrical cable 1214, where electrical cable 1214 is configured to transmit power and data electrical signals from an electronic control module such as electronic control module 106 to the electrical coil 1205. The electrical coil 1205 converts the power and data electrical signals to magnetic signals, which are then received by a receiver coil such as receiver coil 506, where receiver coil 506 is located in the proximity of transmitter coil 1208.

In some embodiments, electrical coil 1205 may be comprised of an electrically conducting wire such as copper wire wound around a magnetically permeable core such as a ferrite core. In other embodiments, the electrical coil 1205 may be comprised of an electrically conducting wire such as copper wire wound around an air core. In other embodiments, electrical coil 1205 has a diameter of ⅛ inch or larger.

The embodiment 1208 is especially advantageous in situations where a transmitter coil such as transmitter coil 508 is installed in a door frame that is substantially comprised of a metal such as steel. Installing a transmitter coil in a steel door frame may result in a loss of electrical power coupling efficiency as a certain amount of electrical power generated by the transmitter coil may be dissipated within the steel door frame as, for example, eddy current losses. Due to this, the power received by the receiver coil is reduced to the point where this received power may be insufficient to charge the rechargeable battery. Installing the transmitter coil in a door frame may involve having to, for example, drill a hole in the door frame. Safety regulations mandated by organizations such as Underwriters Laboratories (UL) may limit the size of the hole that can be drilled in the door frame to, for example, ¾ inch in diameter. Therefore, there is a physical constraint on the dimensions of the transmitter coil which, in turn, limits the amount of electromagnetic power that the transmitter coil can handle and transmit. The combination of the physical constraints imposed by safety regulations coupled with the lossy effects of a door frame comprised of a material such as steel thus presents a challenge with regards to the amount of power that can be effectively transmitted from the transmitter coil to the receiver coil.

Surrounding the electrical coil 1205 by magnetically permeable material such as ferrite strip 1210 reduces the eddy current losses, since the ferrite strip 1210 serves to direct the magnetic field lines generated by electrical coil 1205 away from the door frame. In other words, the magnetic field lines generated by electrical coil 1205 flow through the magnetically permeable enclosure created by ferrite strip 1210 rather than flowing into the door frame and being dissipated as losses. In some embodiments, the diameter of the electrical coil 1205 may be up to half the diameter of the hole drilled in the door frame, as larger electrical coil diameters are associated with greater eddy current losses. In other embodiments, the electrical coil associated with the receiver coil (not shown) may be an airwound coil (an electrical coil with an air core) with a diameter that may range from ⅜ inch to 1 inch. In still other embodiments, the electrical coil associated with the receiver coil may be wound around a core with low magnetic permeability.

Figure 13A:
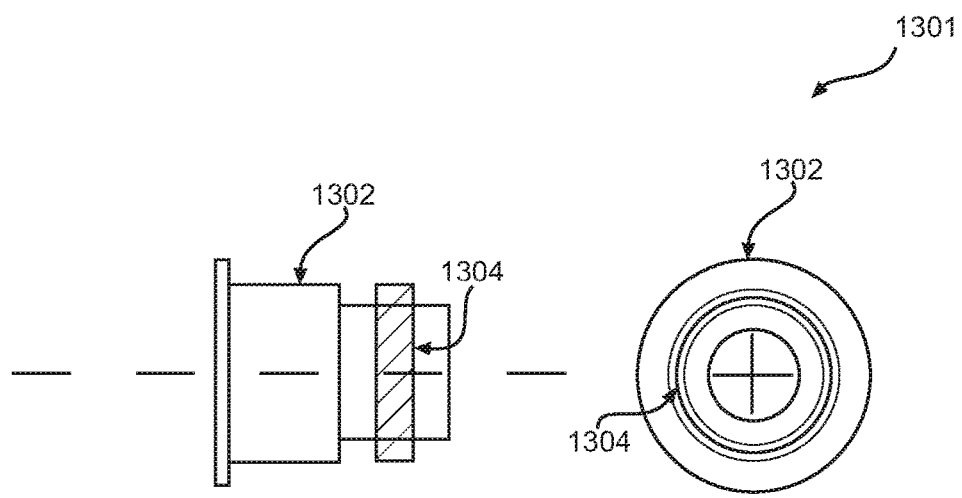
FIGS. 13A and 13B depict two different embodiments of a receiver coil associated with the wireless battery charging system.

FIG. 13A depicts an embodiment 1301 of a receiver coil associated with the wireless battery charging system. In some embodiments, the receiver coil may be similar to receiver coil 506. The embodiment 1301 shows the receiver coil being comprised of an assembly 1302, where the assembly 1302 may be constructed by using an outer hollow cylinder and an inner hollow cylinder as described in the description of the embodiment 1200 of the transmitter coil. An electrical coil 1304, wound around a core of low magnetic permeability, is configured to slide onto the assembly 1302 such that the electrical coil 1304 is substantially coaxial to the assembly 1302. In some embodiments, the core of low magnetic permeability associated with the electrical coil 1304 may be of a material such as plastic or wood. In other embodiments, the electrical coil 1304 may have an air core. In some embodiments, electrical coil 1304 may be attached to assembly 1302 via friction. In other embodiments, electrical coil 1304 may be attached to assembly 1302 using adhesive or other attachment technique. The combination of assembly 1302 and electrical coil 1304 that comprises the receiver coil 1301 may be disposed within a door such as door 502. The diameter of the electrical coil 1304 may range from approximately ¼ inch to approximately ¾ inch.

It is important to note that the electrical coil 1304, when wound around a core of low magnetic permeability, functions effectively when disposed within or surrounded by a structure with low magnetic permeability such as wood. In some embodiments, the door within which the receiver coil 1301 is disposed may be a wooden door. This structure can also be extended to the transmitter coil such as transmitter coil 508, when the transmitter coil is disposed within a door frame comprised of a material with low magnetic permeability such as wood, composite or fibers.

Figure 13B:
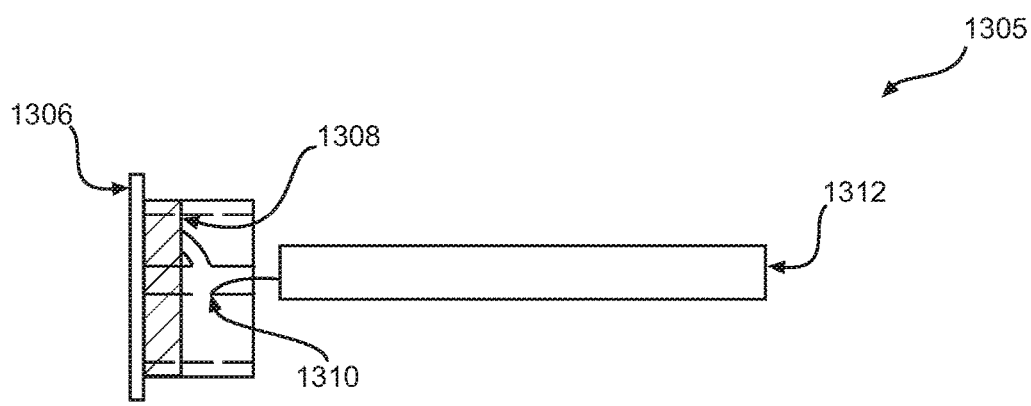

FIG. 13B depicts an embodiment 1305 of a receiver coil associated with the wireless battery charging system. In some embodiments, the receiver coil may be similar to receiver coil 506. The embodiment 1305 shows the receiver coil being comprised of a plastic housing 1306, and an electrical coil 1308 is configured to slide onto the plastic housing 1306 such that the electrical coil 1308 is substantially coaxial to the plastic housing 1306. In some embodiments, the electrical coil 1308 may be wound around a core comprised of a material of low magnetic permeability such as air, wood or plastic. In some embodiments, electrical coil 1308 may be attached to the plastic housing 1306 via friction. In other embodiments, electrical coil 1308 may be attached to plastic housing 1306 using adhesive or some other attachment technique. The combination of plastic housing 1306 and electrical coil 1308 that comprises the receiver coil 1305 may be disposed within a door such as door 502. The diameter of the electrical coil 1308 may range from approximately ¼ inch to approximately ¾ inch.

In some embodiments, electrical coil 1305 may be electrically coupled to an electrical cable 1312 via a printed circuit board 1310. Electrical cable 1312 serves to transmit an electrical signal received by the receiver coil from the transmitter coil to the circuitry associated with charging a rechargeable battery.

It is important to note that the electrical coil 1308, when wound around a core of low magnetic permeability, functions effectively when disposed within or surrounded by a structure with low magnetic permeability such as wood. In some embodiments, the door within which the receiver coil 1305 is disposed may be a wooden door. This structure can also be extended to the transmitter coil such as transmitter coil 508, when the transmitter coil is disposed within a door frame comprised of a material with low magnetic permeability such as wood.

Figure 14:
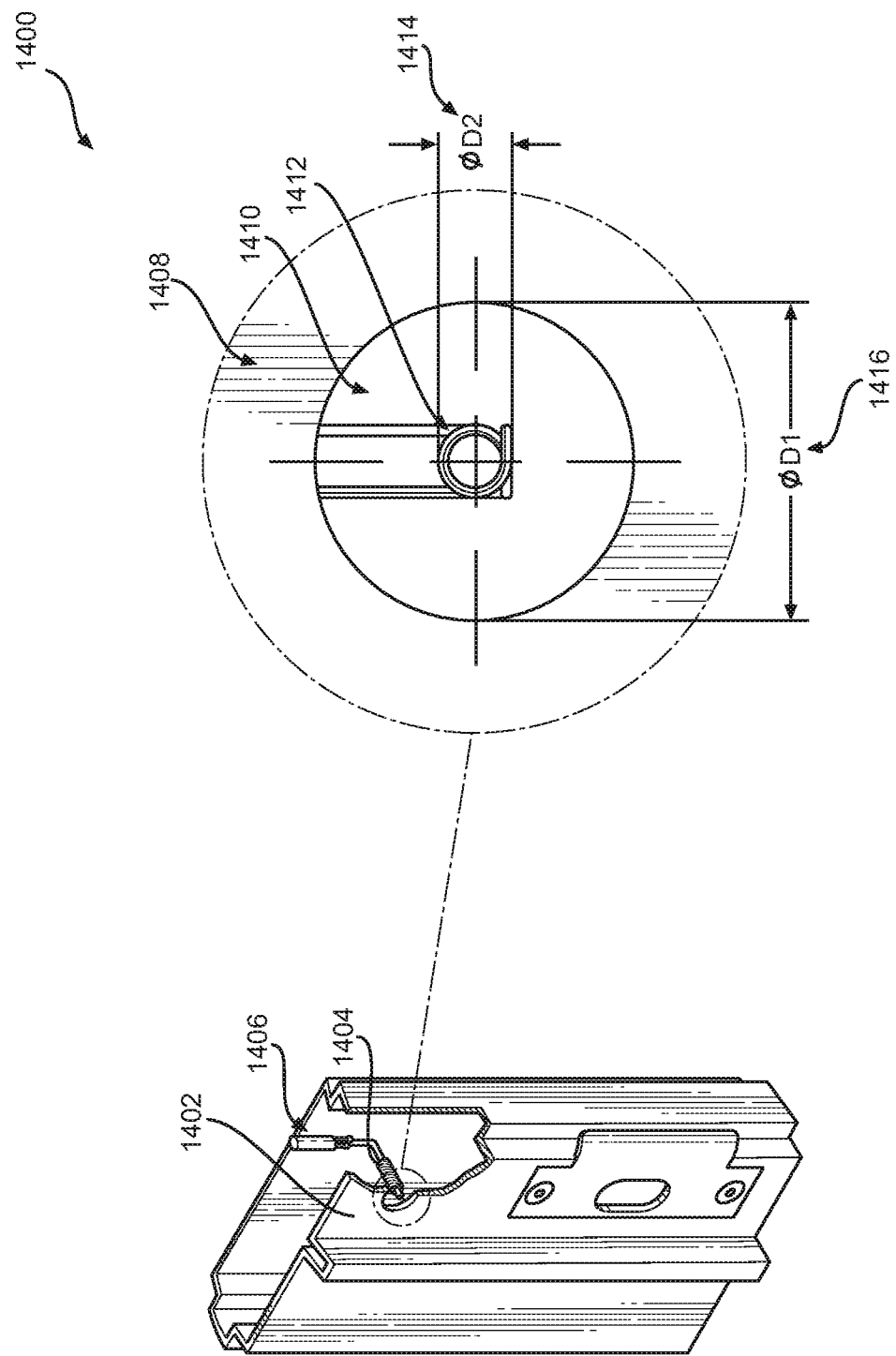
FIG. 14 depicts an embodiment of a transmitter coil associated with the wireless battery charging system as installed in a door frame.

FIG. 14 depicts an embodiment 1400 of a transmitter coil associated with the wireless battery charging system as installed in a door frame. In some embodiments, a transmitter coil 1404 associated with the wireless battery charging system is mounted in a door frame 1402, where the door frame 1402 has a hole drilled to accommodate the transmitter coil 1404 as shown in the figure. Transmitter coil 1404 is electrically coupled to external circuitry such as electronic control module 106 (not shown) via an electrical cable 1406. FIG. 14 also depicts a detailed representation of the installation of the transmitter coil 1404. In some embodiments, a hole 1410 of a diameter D1 1416 is drilled in a steel door 1408. A transmitter coil 1412 of a diameter D2 1414 is mounted substantially coaxially with hole 1410. In some embodiments, transmitter coil 1412 may include a ferrite core. In other embodiments, transmitter coil 1412 may be wound around a core of low magnetic permeability such as air, wood or plastic. In still other embodiments, diameter D2 1414 should be 75% or less than diameter D1 1416 to ensure proper magnetic coupling while minimizing losses such as eddy current losses in cases where the transmitter coil 1412 is installed in, for example a steel door frame or an aluminum door frame. Ideally, diameter D2 1414 should be approximately 25% or less than diameter D1 1416. For example, if diameter D1 1416 is 0.75 inches, then diameter D2 1414 should ideally be approximately 0.1 inch to 0.15 inch. These constraints on diameter D2 1414 and diameter D1 1416 are associated with installation of the transmitter coil 1412 in door frames made of materials such as steel or aluminum since these materials are associated with parasitic losses (such as eddy current losses) due to magnetic field coupling. If the transmitter coil 1412 is installed in a door frame comprised of a material with low magnetic permeability (such as wood) then the restrictions on the relative values of diameter D2 1414 and diameter D1 1416 do not apply, giving the designer more freedom with regards to design parameter selection.

FIG. 15A depicts different views of an embodiment 1500 associated with a receiver coil associated with the wireless battery charging system. In some embodiments, the embodiment 1500 comprises a plastic assembly 1502, and a receiver coil 1504, where the receiver coil is electrically coupled to an electrical cable 1506. The combination of the receiver coil 1504 and the electrical cable 1506 are mechanically coupled to plastic assembly 1502 to give a receiver coil assembly 1508. In some embodiments, plastic assembly 1502 may be comprised of a material such as Bakelite. The mechanical coupling between the combination of the receiver coil 1504 and the electrical cable 1506, and the plastic assembly 1502 may be achieved using friction or adhesive bonding. In some embodiments, receiver coil assembly 1508 may be installed in a door and functions to receive wireless electrical signals from a transmitter coil such as transmitter coil 804 (not shown). In some embodiments, receiver coil 1504 is wound around a core of low magnetic permeability such as air, plastic or wood. In other embodiments, the diameter of the receiver coil 1504 may be less than 1 inch. For example, the diameter of the receiver coil 1504 may be ½ inch. Alternatively, the diameter of the receiver coil 1504 may be of a value between ¼ inch and ¾ inch.

FIG. 15B depicts different views of an embodiment 1510 associated with a receiver coil associated with the wireless battery charging system. Embodiment 1510 essentially depicts different views of receiver coil assembly 1508. 1512 represents a view of the receiver coil assembly 1508 from the end away from the electrical cable 1506. In some embodiments, this end of the receiver coil assembly 1508 may be flat so as to be substantially flush with the surface of the door within which the receiver coil assembly 1508 may be mounted. A side view of the receiver coil assembly 1508 is represented by view 1514. View 1514 depicts a plastic assembly 1516 which may be the same as plastic assembly 1502. View 1514 also depicts an electrical cable 1518 which may be the same as electrical cable 1506. View 1519 depicts the receiver coil assembly 1508 from the end of the electrical cable 1506. View 1519 depicts a plastic assembly 1520 which may be the same as plastic assembly 1502, a receiver coil 1522 which may be the same as receiver coil 1504, and an electrical cable 1524 which may be the same as electrical cable 1506.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An apparatus comprising:
an electronic control module configured to generate a first electromagnetic signal having a first radio frequency to be communicated to a transmitter antenna associated with the electronic control module;
a driver module electrically coupled to the electronic control module, wherein the driver module is configured to receive the first electromagnetic signal and compensate for degradation in signal quality associated with the first electromagnetic signal, and wherein the driver module is electrically coupled to the transmitter antenna;
a receiver antenna wirelessly electrically coupled to the transmitter antenna, wherein the receiver antenna is configured to receive the first signal including a wireless charging signal from the transmitter antenna;
an electronic lock module electrically coupled to the receiver antenna, wherein the electronic lock module is configured to receive the wireless charging signal from the receiver antenna and use the wireless charging signal to charge a rechargeable battery electrically coupled to the electronic lock module; and
a bi-directional data communications link established between the electronic control module and the electronic lock module when both are powered to transmit data signals in a first direction from the electronic control module to the electronic lock module using the first electromagnetic signal, and in a second direction from the electronic lock module to the electronic control module using a second electromagnetic signal having a second radio frequency, wherein the second radio frequency is different from the first radio frequency.

2. The apparatus of claim 1, wherein the driver module includes a plurality of resonant capacitors.

3. The apparatus of claim 1, wherein the driver module is configured to operate at a physical distance of one foot or less from the transmitter antenna.

4. The apparatus of claim 1, wherein the electronic control module is disposed between the driver module and the transmitter antenna.

5. The apparatus of claim 1, wherein the electronic control module is electrically coupled to the driver module via an interface comprising a power signal, a drive signal and a ground.

6. The apparatus of claim 1, wherein the driver module is electrically coupled to the transmitter antenna via an interface comprising a power signal, a drive signal and a ground.

7. The apparatus of claim 1, wherein the transmitter antenna includes a coil.

8. The apparatus of claim 1, wherein the receiver antenna includes a coil.

9. The apparatus of claim 1, wherein the driver module includes a plurality of drive transistors.

10. An apparatus comprising:
an electronic control module configured to generate a signal to be communicated to a transmitter antenna;
a driver module electrically coupled to the electronic control module, wherein the driver module is configured to receive the signal and compensate for degradation in signal quality associated with the signal, and wherein the driver module is electrically coupled to the transmitter antenna;

a receiver antenna wirelessly electrically coupled to the transmitter antenna, wherein the receiver antenna is configured to receive a wireless charging signal from the transmitter antenna; and an electronic lock module electrically coupled to the receiver antenna, wherein the electronic lock module is configured to receive the wireless charging signal from the receiver antenna and use the wireless charging signal to charge a rechargeable battery electrically coupled to the electronic lock module, wherein the driver module includes a squaring circuit, a class B push-pull amplifier, a final amplifier stage and a resonant circuit.

11. The apparatus of claim 10, wherein the squaring circuit serves to compensate for signal degradation associated with a square wave.

12. The apparatus of claim 10, wherein the class B push-pull amplifier has as an input the output of the squaring circuit and is arranged to amplify the power of the output of the squaring circuit.

13. The apparatus of claim 10, wherein the final amplifier stage is arranged to amplify the output of the class B push-pull amplifier to generate a signal of sufficient power to drive the resonant circuit.

14. The apparatus of claim 10, wherein the resonant circuit is arranged to convert the output of the final amplifier stage into a sinusoidal signal suitable for transmission as a wireless charging signal.

15. A method comprising:
generating, using an electronic control module, one or more first electromagnetic signals having a first frequency to be communicated to a transmitter antenna associated with the electronic control module;
transmitting, via a conducting cable, the one or more first electromagnetic signals to a driver module electrically coupled to the electronic control module;
compensating, using the driver module, for signal degradation due to transmission, associated with the one or more first electromagnetic signals;
transmitting, using the driver module, the one or more compensated first electromagnetic signals to the transmitter antenna;
transmitting, via the transmitter antenna, the received compensated first electromagnetic signals as a wireless charging signal to a receiver antenna wirelessly electrically coupled to the transmitter antenna;
transmitting, using the receiver antenna, the wireless charging signal, to an electronic lock module;
charging with the electronic lock module, using the wireless charging signal, a rechargeable battery electrically coupled to the electronic lock module; and
using a bi-directional data communications link configured to transmit first data signals in a first direction from the electronic control module to the electronic lock module using the first electromagnetic signal having the first radio frequency, and second data signals in a second direction from the electronic lock module to the electronic control module using a second electromagnetic signal having a second radio frequency, the second radio frequency being different from the first radio frequency.

16. The method of claim 15, wherein the driver module is configured to operate at a physical distance of one foot or less from the transmitter antenna.

17. The method of claim 15, wherein the electronic control module is disposed between the driver module and the transmitter antenna.

18. The method of claim 15, wherein one or more of the electrical signals received by the driver module are substantially square wave signals that are degraded by transmission, and wherein the compensating includes restoring a degraded square wave signal into a substantially square wave signal.

19. The method of claim 15, wherein the driver module comprises one or more drive transistors.

20. A method comprising:
generating, using an electronic control module, one or more electrical signals to be communicated to a transmitter antenna;
transmitting, via a conducting cable, the one or more electrical signals to a driver module electrically coupled to the electronic control module;
compensating, using the driver module, for signal degradation due to transmission, associated with the one or more electrical signals;
transmitting, using the driver module, the one or more compensated electrical signals to the transmitter antenna;
transmitting, via the transmitter antenna, the received compensated electrical signals as a wireless charging signal to a receiver antenna wirelessly electrically coupled to the transmitter antenna;
transmitting, using the receiver antenna, the wireless charging signal, to an electronic lock module; and
charging with the electronic lock module, using the wireless charging signal, a rechargeable battery electrically coupled to the electronic lock module, wherein the driver module includes a squaring circuit configured to square the one or more electrical signals; a class B push-pull amplifier configured to amplify the one or more electrical signals; a final amplifier stage configured to amplify the one or more electrical signals; and a resonant circuit.

\* \* \* \* \*